US012694393B2

(12) United States Patent (10) Patent No.: US 12,694,393 B2

Osborn et al. (45) Date of Patent: Jul. 28, 2026

(54) INCREASING SENSITIVITY AND READABILITY OF CONTACTLESS CARDS

(71) Applicant: Capital One Services, LLC, McLean, VA (US)

(72) Inventors: Kevin Osborn, Newton Highlands, MA (US); David Wurmfeld, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 265 days.

(21) Appl. No.: 18/527,873

(22) Filed: Dec. 4, 2023

(65) Prior Publication Data

US 2025/0182089 A1 Jun. 5, 2025

(51) Int. Cl.
*G06Q 20/34* (2012.01)
*G06K 7/10* (2006.01)
(Continued)

(52) U.S. Cl.
CPC ....... *G06Q 20/352* (2013.01); *G06K 7/10297* (2013.01); *G06K 7/10336* (2013.01);
(Continued)

(58) Field of Classification Search
CPC . H04B 5/24; H04B 5/263; H04B 5/70; H04B 5/72; H04B 5/26; G06K 19/0723; G06K 19/07783; G06K 7/0008; G06K 7/10128; G06K 7/10297; G06K 7/10336; G06Q 20/352
See application file for complete search history.

(56) References Cited

U.S. PATENT DOCUMENTS 2,937,268 A 5/1960 Downie et al.
4,683,553 A 7/1987 Mollier
(Continued)

FOREIGN PATENT DOCUMENTS

CA 3010336 A1 7/2017
CN 101192295 A 6/2008
(Continued)

OTHER PUBLICATIONS

The International Search Report and Written Opinion mailed Mar. 24, 2024, for corresponding PCT/US2024/057431 (12 pages).
(Continued)

*Primary Examiner* — Lester G Kincaid

(74) *Attorney, Agent, or Firm* — KDW Firm PLLC

(57) ABSTRACT

A method, a system, and a computer program product for increasing sensitivity and/or readability of contactless cards. One or more signals are received from a first device. Each of the signals is responsive to one or more transmissions generated and sent to the first device by a respective receiving coil, upon being energized. A signal strength of each of the signals received from the first device is determined. A first signal in having a highest signal strength is identified based on determined signal strengths of one or more signals. A first receiving coil corresponding to the first signal is selected. The plurality of receiving coils are de-energized. The selected first receiving coil is energized and a communication with the first device is and established using the selected first receiving coil.

19 Claims, 17 Drawing Sheets

~400

RECEIVE ONE OR MORE SIGNALS FROM THE FIRST DEVICE 402

DETERMINE A SIGNAL STRENGTH OF EACH OF THE ONE OR MORE SIGNALS RECEIVED FROM THE FIRST DEVICE 404

DETERMINE THE ONE OR MORE POSITIONS OF THE FIRST DEVICES BASED ON DETERMINED SIGNAL STRENGTHS 406

(51) Int. Cl.
  *G06K 19/07* (2006.01)
  *G06K 19/077* (2006.01)
  *H04B 5/72* (2024.01)

(52) U.S. Cl.
  CPC ..... *G06K 19/0721* (2013.01); *G06K 19/0723*
    (2013.01); *G06K 19/07783* (2013.01); *H04B*
    *5/72* (2024.01)

(56) References Cited

U.S. PATENT DOCUMENTS

| | | |
|---|---|---|
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |

(56)                  References Cited

U.S. PATENT DOCUMENTS

| | | | |
|---|---|---|---|
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |

(56)                References Cited

U.S. PATENT DOCUMENTS

| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger et al. |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer et al. |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller et al. |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |

(56)            References Cited

U.S. PATENT DOCUMENTS

| | | |
|---|---|---|
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0072115 A1* | 3/2013 | Dobyns ............... H04B 5/26 |
| | | 455/41.1 |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef et al. |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein et al. |
| 2015/0088757 A1 | 3/2015 | Zhou et al. |
| 2015/0089586 A1 | 3/2015 | Ballesteros |
| 2015/0113271 A1 | 4/2015 | Jooste et al. |
| 2015/0134452 A1 | 5/2015 | Williams |
| 2015/0134513 A1 | 5/2015 | Olson et al. |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins et al. |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |

(56) References Cited

U.S. PATENT DOCUMENTS

| | | |
|---|---|---|
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0228630 A1 | 8/2017 | Hoyt et al. |
| 2017/0230189 A1 | 8/2017 | Toll et al. |
| 2017/0237296 A1 | 8/2017 | Keith et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2021/0004806 A1 | 1/2021 | Noe |
| 2021/0272098 A1 | 9/2021 | Delsuc et al. |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0239158 A1 | 7/2022 | Palacharla et al. |
| 2022/0247454 A1* | 8/2022 | Wurmfeld .............. G06F 21/72 |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | | |
|---|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| KR | 20150140132 A | 12/2015 |
| WO | 199910824 A1 | 3/1999 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017047855 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Saush, "Getting information from an EMV chip card with Java," Sep. 8, 2006, WordPress, pp. 1-13.

Author Unknown, "Global expansion of card tapping mobile OTP for security and convenience is imminent," Jun. 28, 2022, website: https://www.swidch.com/blogs/card-tapping-motp-blog.

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

(56) References Cited

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE Africon At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

Smart Card Alliance, "Co-Branded Multi-Application Contactless Cards for Transit and Financial Payment," A Smart Card Alliance Transportation Council White Paper (40 pages), Mar. 2008.

Emvco: "EMV Card Personalisation Specification", Aug. 1, 2021, pp. 1-114, Retrieved from the Internet: URL: https://www.emvco.com/specification/?post_id=12467.

* cited by examiner

CONTACTLESS CARD 114

COMPUTING DEVICE 120

PROCESSOR 122

STORAGE 124

RECEIVING COIL 118

126

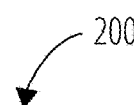

200

RECEIVE ONE OR MORE SIGNALS FROM A FIRST DEVICE 202

DETERMINE A SIGNAL STRENGTH OF EACH OF THE ONE OR MORE SIGNALS RECEIVED FROM THE FIRST DEVICE 204

IDENTIFY A FIRST SIGNAL IN THE ONE OR MORE SIGNALS HAVING A HIGHEST SIGNAL STRENGTH BASED ON DETERMINED SIGNAL STRENGTHS OF THE ONE OR MORE SIGNALS 206

SELECT A FIRST RECEIVING COIL CORRESPONDING TO THE FIRST SIGNAL 208

DE-ENERGIZE THE PLURALITY OF RECEIVING COILS 210

ENERGIZE THE SELECTED FIRST RECEIVING COIL AND ESTABLISH, USING THE SELECTED FIRST RECEIVING COIL, A COMMUNICATION WITH THE FIRST DEVICE 212

FIG. 2

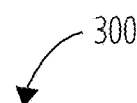

300

DETERMINE ONE OR MORE POSITIONS OF A FIRST DEVICE IN RELATION TO THE PLURALITY OF RECEIVING COILS 302

IDENTIFY A FIRST SIGNAL IN THE ONE OR MORE SIGNALS HAVING A HIGHEST SIGNAL STRENGTH BASED ON THE DETERMINED SIGNAL STRENGTHS OF THE ONE OR MORE SIGNALS 304

SELECT A FIRST RECEIVING COIL CORRESPONDING TO THE FIRST SIGNAL, AND DETERMINE A FIRST POSITION IN THE ONE OR MORE POSITIONS BEING PROXIMATE TO THE FIRST RECEIVING COIL 306

GENERATE AN INDICATION TO REPOSITION THE FIRST DEVICE TO THE FIRST POSITION 308

RECEIVE ONE OR MORE SIGNALS FROM THE FIRST DEVICE <u>402</u>

DETERMINE A SIGNAL STRENGTH OF EACH OF THE ONE OR MORE SIGNALS RECEIVED FROM THE FIRST DEVICE <u>404</u>

DETERMINE THE ONE OR MORE POSITIONS OF THE FIRST DEVICES BASED ON DETERMINED SIGNAL STRENGTHS <u>406</u>

500

DETERMINE A SIGNAL STRENGTH OF EACH OF ONE OR MORE SIGNALS RECEIVED FROM A FIRST DEVICE 502

IDENTIFY A FIRST SIGNAL IN THE ONE OR MORE SIGNALS HAVING A HIGHEST SIGNAL STRENGTH BASED ON DETERMINED SIGNAL STRENGTHS OF THE ONE OR MORE SIGNALS 504

SELECT A FIRST RECEIVING COIL CORRESPONDING TO THE FIRST SIGNAL 506

DE-ENERGIZE THE PLURALITY OF RECEIVING COILS 508

ENERGIZE THE SELECTED FIRST RECEIVING COIL AND ESTABLISH, USING THE SELECTED FIRST RECEIVING COIL, A COMMUNICATION WITH THE FIRST DEVICE 510

FIG. 5

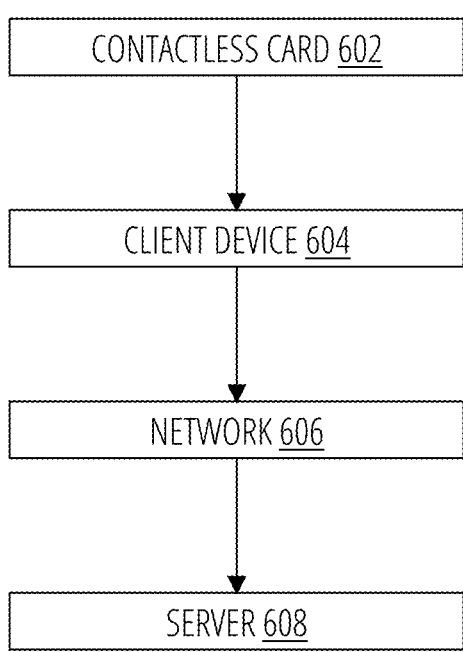
FIG. 6

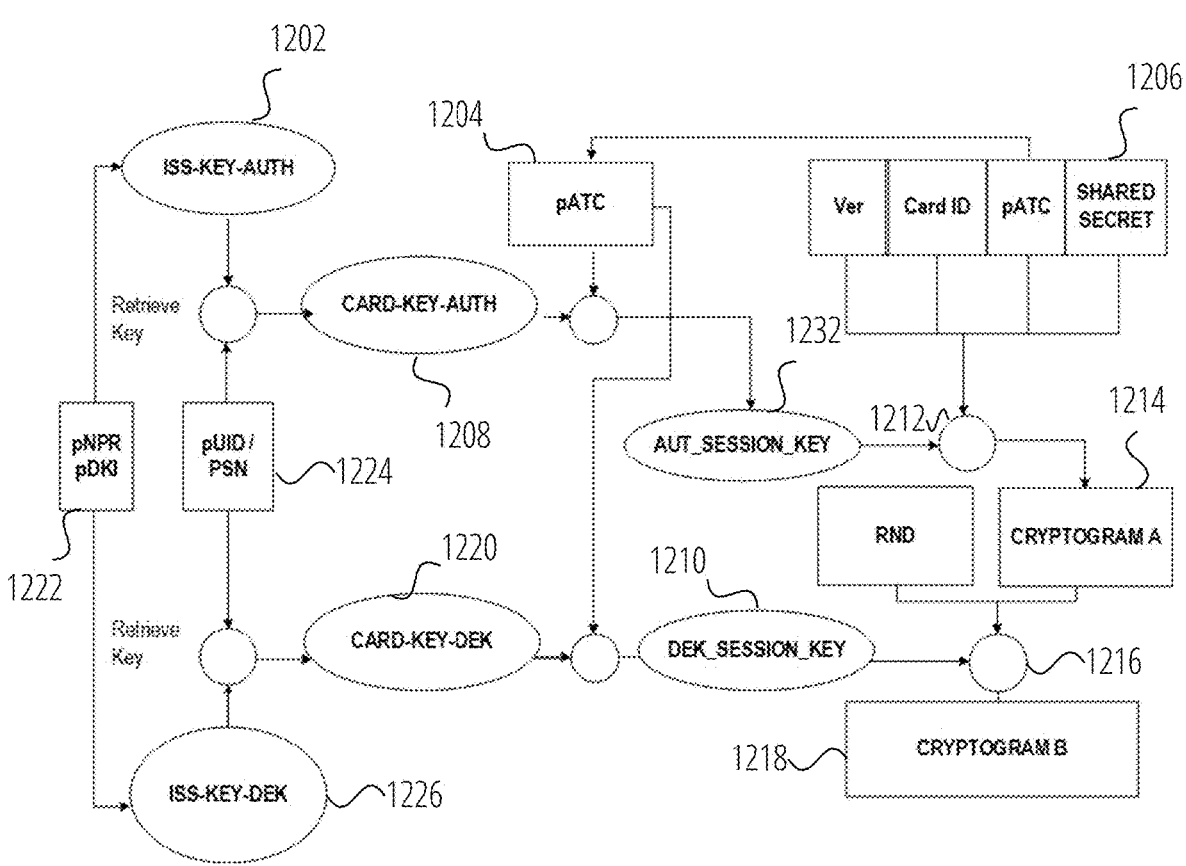
FIG. 12

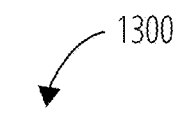
1300
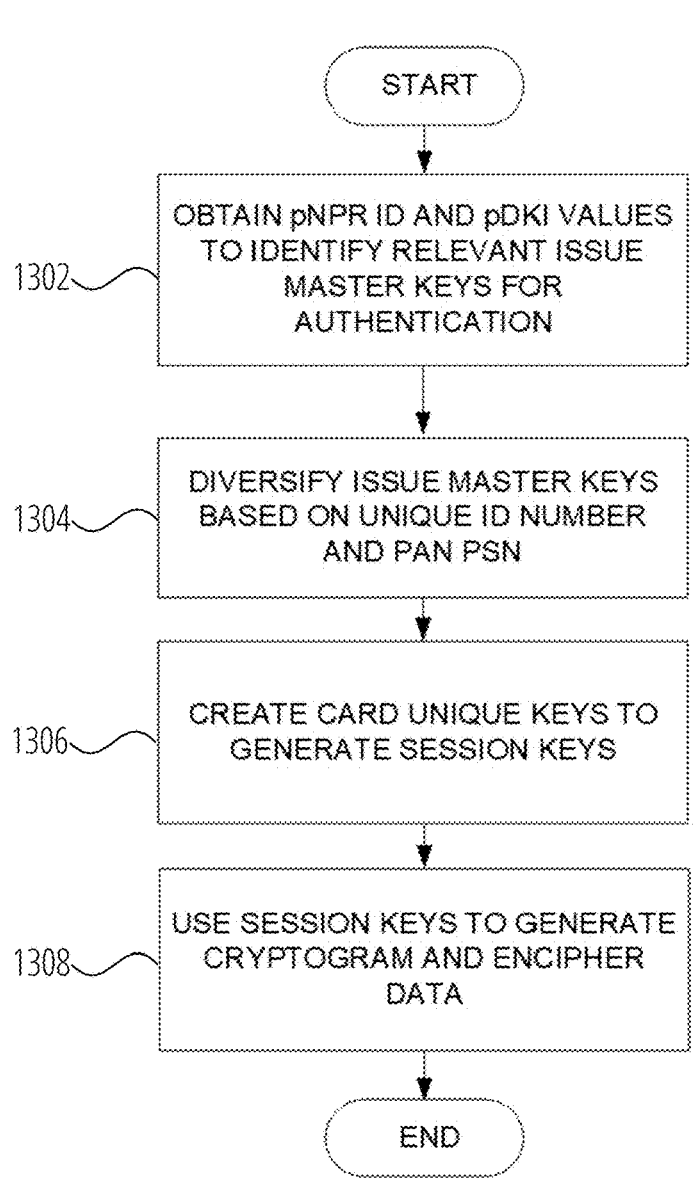
START
1302 — OBTAIN pNPR ID AND pDKI VALUES TO IDENTIFY RELEVANT ISSUE MASTER KEYS FOR AUTHENTICATION
1304 — DIVERSIFY ISSUE MASTER KEYS BASED ON UNIQUE ID NUMBER AND PAN PSN
1306 — CREATE CARD UNIQUE KEYS TO GENERATE SESSION KEYS
1308 — USE SESSION KEYS TO GENERATE CRYPTOGRAM AND ENCIPHER DATA
END
FIG. 13

INCREASING SENSITIVITY AND READABILITY OF CONTACTLESS CARDS

TECHNICAL FIELD

This disclosure relates generally to data processing and, in particular, to contactless cards, and more particularly, to increasing sensitivity and/or readability of contactless cards in a variety of computing environments, such as, for example, including mobile and/or non-mobile devices that allow use of tapping to execute transactions.

BACKGROUND

Tap-to-pay transactions have become some of the most popular ways of paying for goods and services. Tap-to-pay is based on near-field communication (NFC) technology that may be embedded into credit cards, smartphones, and other mobile devices. This technology allows users to make credit card transactions by bringing their cards and/or smartphones within a specific distance of (or tapping on) specific areas of point-of-sale terminals, which enables transfer of certain data for the purposes of making a payment. However, existing tap-to-pay terminals (mobile and/or stationary) have small, weak field readers, which make it difficult to establish connections between cards and readers, thereby hindering use of tap-to-pay cards.

SUMMARY

In some implementations, the current subject matter relates to a computer-implemented method for increasing sensitivity and/or readability of contactless cards. The method may include receiving, using at least one processor, one or more signals from a first device, each of the signals may be responsive to one or more transmissions generated and sent to the first device by a respective receiving coil, upon being energized, in a plurality of receiving coils. The plurality of receiving coils may be communicatively coupled to at least one processor. The method may also include determining a signal strength of each of the signals received from the first device, identifying a first signal in one or more signals having a highest signal strength based on determined signal strengths of the signals, selecting a first receiving coil corresponding to the first signal, de-energizing the plurality of receiving coils, energizing the selected first receiving coil and establishing, using the selected first receiving coil, a communication with the first device.

In some implementations, the current subject matter may include one or more of the following optional features. The first device may be a contactless card. A second device may include the processor and the plurality of receiving coils. Establishing the communication may include establishing a near-field communication (NFC) exchange between the second device and the contactless card. The contactless card, based on the establishing of the NFC exchange, may be configured to transmit to the second device a contactless card data. The contactless card data may include at least one of the following: an account number associated with the contactless card, an expiration date associated with the contactless card, a card verification value (CVV) associated with the contactless card, a billing address associated with the contactless card, a name of a user associated with the contactless card, and any combination thereof.

In some implementations, the contactless card may include at least one of the following: a credit card, a debit card, an electronic gift card, a pre-paid credit card, a pre-paid debit card, and any combination thereof.

In some implementations, the plurality of receiving coils may be energized simultaneously, and, upon may be energized, each of the plurality of receiving coils may be configured to generate and send a respective transmission to the first device.

In some implementations, the plurality of receiving coils may be energized using a predetermined order, and, upon may be energized, each of the plurality of receiving coils may be configured to generate and send a respective transmission to the first device based on the predetermined order.

In some implementations, the selected first receiving coil may be configured to receive a highest current for energizing the first receiving coil.

In some implementations, the energizing may include energizing the selected first receiving coil and de-energizing remaining receiving coils in the plurality of receiving coils.

In some implementations, the method may also include determining one or more positions of the first device in relation to the plurality of receiving coils based on the determined signal strengths. The method may further include selecting a first position of the first device from one or more positions of the first device in accordance with the selected first receiving coil. The first position may correspond to the first device being proximate to the selected first receiving coil and may be distal to remaining receiving coils in the plurality of receiving coils. The method may include generating an indication to reposition the first device in accordance with the selected first position and displaying the generated indication on a graphical user interface communicatively coupled to the processor.

In some implementations, the current subject matter relates to a system for increasing sensitivity and/or readability of contactless cards. The system may include at least one processor that may be communicatively coupled to a plurality of receiving coils and at least one non-transitory storage media storing instructions, that when executed by the processor, may cause the processor to perform operations including determining one or more positions of a first device in relation to the plurality of receiving coils. The determining may include receiving one or more signals from the first device, where each of the one or more signals may be responsive to one or more transmissions generated and sent to the first device by a respective receiving coil, upon may be energized, in the plurality of receiving coils. The operations may also include determining a signal strength of each of one or more signals received from the first device and determining the one or more positions of the first devices based on determined signal strengths. The operations may also include identifying a first signal in one or more signals having a highest signal strength based on the determined signal strengths of one or more signals, selecting a first receiving coil corresponding to the first signal, determining a first position in one or more positions that may be proximate to the first receiving coil, and generating an indication to reposition the first device to the first position.

In some implementations, the current subject matter may include one or more of the following optional features. The operations may further comprise de-energizing the plurality of receiving coils, and energizing the selected first receiving coil and establishing, using the selected first receiving coil, a communication with the first device. The operations may also comprise displaying the generated indication on a graphical user interface communicatively coupled to the at least one processor. The first device may be a contactless card, where the establishing the communication may include establishing a near-field communication (NFC) exchange with the contactless card. The contactless card, based on the establishing of the NFC exchange, may be configured to transmit a contactless card data. The contactless card data may include at least one of the following: an account number associated with the contactless card, an expiration date associated with the contactless card, a card verification value (CVV) associated with the contactless card, a billing address associated with the contactless card, a name of a user associated with the contactless card, and any combination thereof.

In some implementations, the selected first receiving coil may be configured to receive a highest current for energizing the first receiving coil.

In some implementations, energizing may include energizing the selected first receiving coil and de-energizing remaining receiving coils in the plurality of receiving coils.

In some implementations, the current subject mater may relate to a computer program product comprising a non-transitory machine-readable medium storing instructions that, when executed by at least one programmable processor, may cause the programmable processor to perform operations comprising: determining a signal strength of each of one or more signals received from a first device, wherein each of one or more signals may be responsive to one or more transmissions generated and sent to the first device by one or more receiving coils in a plurality of receiving coils, upon may be energized, identifying a first signal in one or more signals having a highest signal strength based on determined signal strengths of one or more signals, selecting a first receiving coil corresponding to the first signal, de-energizing the plurality of receiving coils; and energizing the selected first receiving coil and establishing, using the selected first receiving coil, a communication with the first device.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 illustrates an exemplary process for increasing readability of a contactless card and/or any other mobile device, according to some implementations of the current subject matter;

FIG. 3 illustrates another exemplary process for increasing readability of a contactless card and/or any other mobile device, according to some implementations of the current subject matter;

FIG. 5 illustrates yet another exemplary process for increasing readability of a contactless card and/or any other mobile device, according to some implementations of the current subject matter;

FIG. 6 illustrates an aspect of the subject matter, according to some implementations;

FIG. 12 is a diagram of a key system, according to some implementations of the current subject matter;

FIG. 13 is a flowchart of a method of generating a cryptogram, according to some implementations of the current subject matter;

DETAILED DESCRIPTION

Figure 1A:
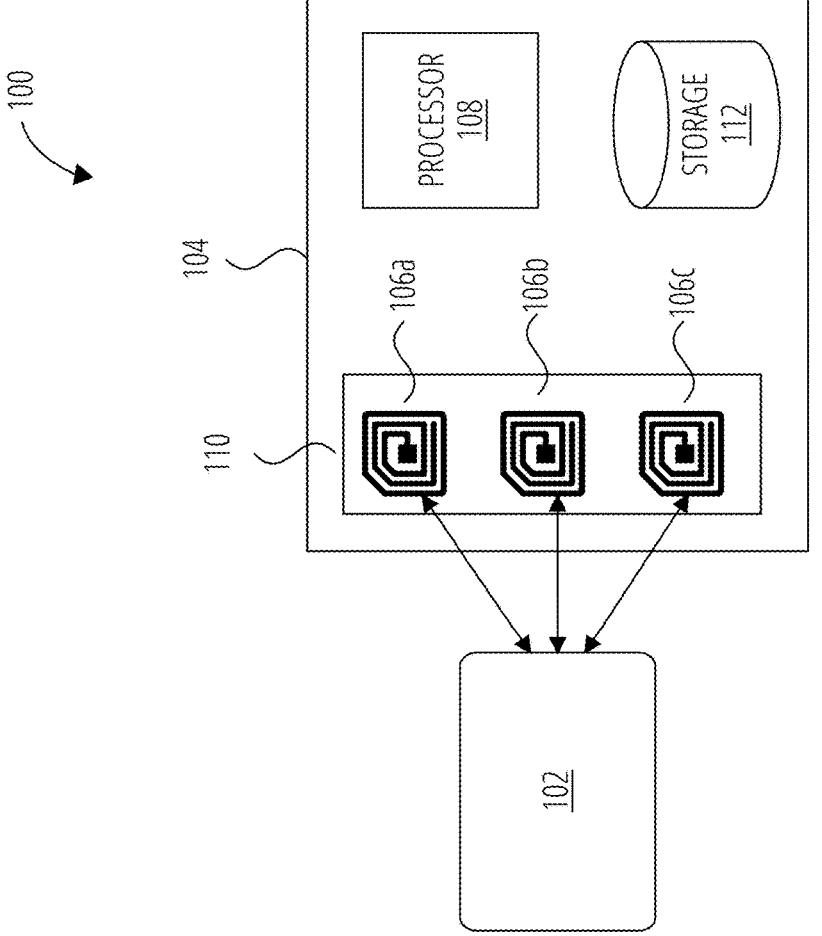
FIG. 1A illustrates an exemplary system for determining readability of contactless cards in a variety of computing environments, according to some implementations of the current subject matter.

To address these and potentially other deficiencies of currently available solutions, one or more implementations of the current subject matter relate to methods, systems, articles of manufacture, and the like that can, among other possible advantages, provide an increasing sensitivity and/or readability of contactless cards in a variety of computing environments, such as, for example, including mobile and/or non-mobile devices that allow use of tapping to execute transactions.

In some implementations, the current subject matter relates to providing an improved sensitivity/readability in interfaces, such as, for example near-field communication exchange interfaces, between a contactless card and/or a mobile device, and another mobile and/or non-mobile device. In an exemplary, non-limiting, implementations, a contactless card (such as, for example, a card shown and described herein in connection with FIGS. 6-15 below) may be configured to communicate with a computing device (e.g., a mobile phone, a point-of-sale terminal, and/or any other type of computing device).

The computing device may be configured to include a plurality of receiving coils that may be energized for the purposes of generation and/or transmission of signals to the contactless card. Energizing of the receiving coils may be accomplished, for example, by supplying current to the coils from a power source of the computing device via one or more circuits also incorporated into the computing device. Each of the receiving coils may be configured as a transceiver and may transmit and/or receive signals to/from the contactless card. The receiving coils may be configured to transmit signals using different and/or same frequencies. Transmission of signals may be accomplished via a near-field communication (NFC) exchange and/or interface. As can be understood, any other way of providing communication between the contactless card and the computing device are possible.

Upon transmission of one or more signals to the contactless card by one or more receiving coils, the computing device may be configured to determine signal strengths of the signals that have been transmitted to and/or received from the contactless card. The signal strengths may be used to further determine location of the contactless card in relation to each of the receiving coils that may have transmitted a signal to the contactless card and/or which receiving coil may have generated/transmitted and/or received the strongest signal. One or more processors of the computing device may be configured to obtain signal strength measurements from one or more sensors that may be incorporated into the computing device and/or the receiving coils. The sensors may be current sensors that may be indicative of the current being supplied to the receiving coils and/or generated by the receiving coil upon receiving one or more signals from the contactless card. Alternatively, or in addition, in some example implementations, the current subject matter, for the purposes of signal strength measurements, may be configured to use a radio frequency (RF) detector together with the receiving coil(s), which may be implemented in a diode, capacitor, divider, etc. circuitry. Moreover, the current subject matter may also be configured to use data integrity interrogation techniques that may rely on and/or use at least a portion of signal bandwidth to detect and/or determine whether there is any missing information in the signal(s) (e.g., dropped bits), such as, for instance, using a modified Manchester encoder and/or any other similar device. As can be understood, any other type of sensors may be used to determine signal strengths.

Upon analyzing strengths of signals, the computing device may be configured to identify a signal that may have the highest signals strength when compared to other signals. The signal strength may be of the signal that may have been generated/transmitted to the contactless card and/or received from the contactless card. One or more processors of the computing device may be configured to execute a comparison of signal strength data that it may receive from the receiving coils and/or any other sensors, to rank signal strengths from highest to lowest. Once ranked, the processor may determine which receiving coil may correspond to the highest signal strength and/or highest current being received by that coil. This may be accomplished using one or more identifiers and/or any other data that may be contained within the signal processed by one or more processors of the computing device for the purposes of signal strength analysis.

When the signal with the highest strength and corresponding receiving coil are identified, such receiving coil may be selected as the receiving coil for further communications with the contactless card. The other receiving coils may be de-energized (e.g., the processor(s) may turn off supply of current to them from computing device's power source). The selected receiving coil may also be temporarily de-energized.

To establish communications with the contactless card, the selected receiving coil may again be energized (e.g., current supplied to it). The computing device may then use the energized selected receiving coil to establish a communication link (e.g., via NFC) with the contactless card for energizing contactless card's chip, perform further exchange of data, etc.

In some implementations, once the communication has been established between the computing device and the contactless card, the contactless card may be configured to transmit various data/information to the computing device via the NFC interface/exchange. For example, the data/information may include at least one of the following: an account number associated with the contactless card, an expiration date associated with the contactless card, a card verification value (CVV) associated with the contactless card, a billing address associated with the contactless card, a name of a user associated with the contactless card, and any combination thereof, and/or any other data/information. Moreover, the contactless card may be a credit card, a debit card, an electronic gift card, a pre-paid credit card, a pre-paid debit card, and any combination thereof, and/or any other type of contactless card.

In some implementations, the computing device may be configured to simultaneously energize (e.g., supply current to) all of its receiving coils. Alternatively, or in addition, the coils may be energized using a predetermined order (e.g., sequentially, etc.). Once energized, the coils may be configured to transmit and/or receive signals to/from the contactless card in accordance with the energizing schedule (e.g., simultaneous, predetermined order, etc.).

In some implementations, the computing device may be configured to determine a location (e.g., proximity) of the contactless card with regard to each of the receiving coils that has transmitted and/or received a signal from the contactless card. For example, the proximity of the contactless card with regard to each specific receiving coil may be determined based on a strength of the signal that may have been received from the contactless card, i.e., the stronger the received signal is as received by a particular coil, the more proximal the contactless card is to that coil.

Using the proximity data, the computing device may be configured to generate an indication (for instance, to the user using the contactless card to communicate with the computing device) to reposition the contactless card to be closer to or more proximate to a specific receiving coil. This may ensure that the communication established between the computing device and the contactless card will not be affected by weak-strength signals and/or be interrupted as a result of weak signals.

In some implementations, the computing device may be configured to select an optimal position (out of a plurality of positions) of the contactless card in relation to the computing device to which the user may be prompted to position and/or reposition the contactless card. The selected optimal position may be determined based on an identification of a receiving coil of the computing device receiving the strongest signal, and/or any other parameters. The selected position may be indicative of the contactless card being proximal to a particular receiving coil, while being distant from other receiving coils.

In some implementations, the computing device may include a graphical user interface. The selected optimal position (and/or any other position) may be displayed on the graphical user interface. Further, the graphical user interface may display guiding instructions to the user to move the contactless card to the selected position. Once the position is reached, an appropriate indication may be displayed on the graphical user interface (e.g., a checkmark, etc.) and/or any other alert may be generated by the computing device.

Alternatively, or in addition, the mobile device and/or any other device (e.g., a reader, etc.) that may be configured to scan and/or read a contactless card may be configured to include a single receiving coil (e.g., a small area coil) that may be used for scanning the contactless card. The single coil may be energized for generating and/or sending of signals to the contactless card. As discussed above, the receiving coil may be energized by supplying current to the coil from a power source of the computing device. The receiving coils may be used as a transceiver and may transmit/receive to/from the contactless card. A near-field communication (NFC) exchange and/or interface may be used for exchanging of signals between the receiving coil and the contactless card. As can be understood, any other way of providing communication between the contactless card and the computing device are possible.

In some example, non-limiting implementations, the contactless card may be configured to include and/or be subdivided into one or more "virtual" areas and/or squares that may be arranged in a grid-like fashion. The areas may be used by the computing device to perform scanning of the card with the receiving coil to identify a location on the card that may cause the receiving coil to establish the strongest connection signal between the card and the computing device. For example, the identified location on the card may correspond to the receiving coil on the card, which interacts with the receiving coil in the computing device as the contactless card is scanned by the computing device. The identified location may be disposed within a single area of the card and/or may span multiple areas.

Each area on the contactless card may have the same and/or different dimensions as another area on the card. The dimensions and/or positioning of the areas on the contactless card may be predetermined using the computing device. For example, the computing device may be provided with dimensions of the card and one or more processors of the computing device may be configured to generate a virtual grid of areas for the card. The virtual grid may then be used to guide the user, during scanning of the card, to position the card's receiving coil proximate to the receiving coil of the computing device.

In some implementations, the computing device may be configured to generate the virtual grid so that the areas on the contactless card are uniformly distributed on the back and/or the front of the card. The areas on the back of the card may and/or may not overlap with the areas on the front of the card. The computing device may generate a single grid for both sides of the card and/or may generate separate grids for the back and the front of the card. Scanning of the card may be performed using a specific side of the card and the corresponding virtual grid.

Upon scanning of the card, the computing device may determine card's positional sensitivity for each area and/or multiple areas in the grid. The positional sensitivity may correspond to a strength of the signal between the card's receiving coil and the receiving coil of the computing device, as determined based on a current response of the receiving coil of the computing device. The stronger the signal, the greater the positional sensitivity is for a particular area on the grid of the card. This may mean that the receiving coil of the card may be proximate to and/or located in the area with the greater positional sensitivity. Based on this information, the user may be instructed, via the computing device, to move the card to the area with the greater positional sensitivity.

In some example, non-limiting implementations, the generated grid may be arranged in rows and columns. As can be understood, any other arrangement of the grid is possible. The positional sensitivity may, for instance, be determined for each column and/or for each row (e.g., separately for the front of the card and/or the back of the card). In this case, the positional sensitivity may be determined as respective average values for each column and each row. For example, assuming the card's grid has 3 rows and 5 columns, positional sensitivity for each row may be determined as $(\frac{1}{5}+\frac{1}{5}+\frac{2}{5})/3=0.2666 \ldots$, and positional sensitivity for each column may be determined as $(0+\frac{1}{3}+\frac{1}{3}+\frac{2}{3}+0)/5=0.2666 \ldots$. As can be understood, any other way of determined positional sensitivity (e.g., using weighting algorithms) may be used.

The positional sensitivity values may be displayed on a graphical user interface (GUI) of the computing device and may indicate to the user whether or not the user is positioning the card (and its coil and/or EMV module) proximate to the receiving coil of the computing device. Alternatively, or in addition, the GUI of the computing device may display arrows and/or any other graphical indicators determined based on the positional sensitivity values for guiding the user in positioning and/or repositioning the card vis-à-vis the computing device's receiving coil. Once optimal position of the contactless card is achieved (as may be determined based on the highest positional sensitivity value), the computing device may display an appropriate indicator (e.g., a check mark, etc.) on the GUI, generate an audible alert, display a message, and/or provide any other indication that optimal position of the card has been achieved.

FIG. 1A illustrates an exemplary system 100 for determining readability of contactless cards in a variety of computing environments, according to some implementations of the current subject matter. The system 100 may include a computing and/or a first computing device 102 and a computing and/or a second computing device 104. The computing device 102 may be a contactless card, such as, for example, a contactless card that is shown and described in connection with FIGS. 6-15. Alternatively, or in addition, the computing device 102 may be mobile device (e.g., a smartphone, a mobile telephone, a tablet computer, etc.). The computing device 104 may be a mobile device, a point-of-sale device, a stationary computing device, an automated teller machine (ATM), and/or any other type of computing device. The computing device 104 may be configured to be coupled to various other computing devices, servers, etc. (not shown in FIG. 1A).

In some implementations, one or more components of the system 100 may include any combination of hardware and/or software. One or more components of the system 100 may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example implementations, one or more components of the system 100 may be disposed on a single computing device and/or may be part of a single communications network. Alternatively, or in addition to, such services may be separately located from one another. A service may be a computing processor, a memory, a software functionality, a routine, a procedure, a call, and/or any combination thereof that may be configured to execute a particular function associated with the current subject matter.

In some implementations, the system 100's one or more components may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system 100 also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 100 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. One or more components of the system 100 may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some example implementations, one or more components of the system 100 may execute one or more applications, such as software applications, that enable, for example, network communications with one or more components of system 100 and transmit and/or receive data.

One or more components of the system 100 may include and/or be in communication with one or more servers via one or more networks and may operate as a respective front-end to back-end pair with one or more servers. One or more components of the system 100 may transmit, for example from a mobile device application (e.g., executing on one or more user devices, components, etc.), one or more requests to one or more servers (not shown in FIG. 1A). The requests may be associated with retrieving data from servers. The servers may receive the requests from the components of the system 100. Based on the requests, servers may be configured to retrieve the requested data from one or more databases. Based on receipt of the requested data from the databases, the servers may be configured to transmit the received data to one or more components of the system 100, where the received data may be responsive to one or more requests.

The system 100 may include one or more networks, such as for example, networks to which the computing devices 102 and/or 104 may be configured to connect to. In some implementations, networks may be one or more of a wireless network, a wired network or any combination of wireless network and wired network and may be configured to connect the components of the system 100 and/or the components of the system 100 to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 100 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system 100.

One or more components of the system 100 may be configured to execute one or more transactions using one or more containers. In some implementations, each transaction may be executed using its own container. A container may refer to a standard unit of software that may be configured to include the code that may be needed to execute the action along with all its dependencies. This may allow execution of actions to run quickly and reliably.

As shown in FIG. 1A, the computing device 104 may include an array of receiving coils 110, which may include one or more receiving coils 106 (*a, b, c*), a processor 108, and an optional storage location 112. The coils 106 may be configured to be arranged within the array 110 in any desired manner. For example, as shown in FIG. 1A, the coils 106 may be arranged in one or more columns, one or more rows, circularly, randomly and/or in any other desired way.

The coils 106 may be coupled to and/or be part of one or more circuits (not shown in FIG. 1A) and/or power sources (not shown in FIG. 1A) that may be configured to provide current to the coils 106 and/or detect signals that may be received by the coils 106. The coils 106 may be configured to be used to transmit one or more signals to the device 102. Further, the coils 106 may also be used for receiving one or more signals from the device 102. In some implementations, the device 104 may be configured to determine signal strength of any of the signals transmitted and/or received to/from the device 102. For example, the device 104 may be configured to measure current that may be supplied to each coil 106 for generation of signals for transmission to the device 102 and/or current produced by each of the coils 106 as a result, for example, receipt of one or more signals from the device 102. As can be understood, any other measurements and/or signal sensing may be performed for the purposes of determining signal strengths. The data associated with such measurements/sensing may be provided to the processor 108. The processor 108 may then determine signal strengths associated with each signal that may be transmitted/received by each coil 106. The processor 108 may then use the signal strength data to rank signal strengths from highest to lowest (and/or vice versa). Such ranking of signal strengths may be used to determine which of the coils 106 may be transmitting and/or receiving signals at the highest strength and hence, used for further communications with the device 102.

Using the ranked signal strength data, the processor 108 may be configured to determine that a specific coil 106 (e.g., coil 106a) may be transmitting and/or receiving signals at the highest strength. Upon such determination, the processor 108 may select coil 106a for further communication with the device 102. To do so, for example, the processor 108 may temporarily de-energize (e.g., stop supply of current to) the coil 106a and also de-energize other coils 106b and 106c, and then energize only the coil 106a while keeping coils 106b and 106c de-energized. The energized coil 106a may then be used to establish communication with the device 102.

Moreover, the device 104 may be configured to determine location proximity (e.g., how far the device 102 is from each of the coils) of the device 102 to each of the coils 106 based on the determined signal strengths. This may allow the device 104 to make and/or refine selection of a specific coil 106 for further communication. Further, location of the device 102 relative to each coil 106 may be helpful in determining movement sensitivity of the device 102 with regard to each coil 106. This further enables positioning of the device 102 proximate to a specific coil 106, which may be transmitting/receiving strongest signals and/or may be providing more reliable communications.

In some example implementations, upon the processor 108 selecting of coil 106a for further communication with the device 102, the user of the device 102 may be prompted to position and/or re-position of the device 102 proximate to the coil 106a. For instance, the device 104 may be configured to include a graphical user interface (not shown in FIG. 1A) that may display one or more instructions to the user of the device 102 with regard to how to position/re-position the device 102 so that it is proximate to the coil 106a and/or within a predetermined distance/area of the coil 106a. Upon determining that the device 102 is located within the predetermined distance/area of the coil 106a, the device 104 may be configured to display an appropriate indication to the user of the device 102 that the device 102 is located within such distance/area of the coil 106a and is ready for communication.

The processor 108 may be configured to perform determination of whether the device 102 is positioned within a predetermined distance/area of the coil 106a. For example, the processor 108 may use data related to strengths of signals transmitted/received between the device 102 and the coil 106a for such determination. For example, if the measured signal strengths are within a predetermined threshold, the processor 108 may be configured to determine that the device 102 has been positioned within the predetermined distance/area of the coil 106a. Otherwise, the processor 108 may cause generation of one or more instructions for displaying on the graphical user interface to alert the user 102 to re-position the device 102. The alert may include one or more instructions on how the device 102 may be repositioned. The instructions may be based on location information determined using signal strength data related to transmitted/received signals between the device 102 and coil 106a. For example, if the device 102 is farther away from the coil 106a, any signals transmitted/received between the device 102 and the coil 106a may be weaker than if the device 102 is closer to the coil 106a, and thus, the processor 108 may determine that the device 102 needs to be moved closer to the coil 106a, and generated an instruction to the user to do so accordingly.

Once the device 102 is positioned within the predetermined distance/area of the selected coil 106 (e.g., coil 106a), the device 102 and the device 104, using energized coil 106a may be configured to establish a communication link, e.g., a near field communication (NFC) exchange link. The other coils 106 of the device 104 would remain de-energized, so as not to interfere with communications provided by the selected coil 106a.

As part of the NFC exchange link, the device 104 may act as an "active" component and provide power to energize the device 102, which may be considered as a "passive" component. Moreover, the devices 102 and/or 104 may be securely linked to an account at a financial institution that may have available funds deposited therein (e.g., a checking account, a saving account, etc.). Access to any accounts that may be associated with devices 102 and/or 104 may be secured/protected using various authentication/authorization mechanisms (e.g., username and password, user biometrics, passcodes, multi-factor authentication tokens, etc.).

As part of the NFC exchange, upon detecting the device 102 to be within a predetermined distance/area of the device 104 (e.g., coil 106a), the device 104 may request and/or be automatically provided with various identification data from the device 102. The identification data may include various information identifying the device 102 and/or user of the device 102. It may include one or more identifiers that may be used to identify the device 102. Assuming the device 102 is a contactless card, the device 102 may also transmit various contactless card data to the device 104. The contactless card data may include, for instance, but is not limited to, at least one of the following: an account number associated with the contactless card, an expiration date associated with the contactless card, a card verification value (CVV) associated with the contactless card, a billing address associated with the contactless card, a name of a user associated with the contactless card, and any combination thereof. The device 104 may then transmit the received identification data to one or more servers (not shown in FIG. 1A) that may be communicatively coupled to the device 104, for any further processing.

Figure 1B:
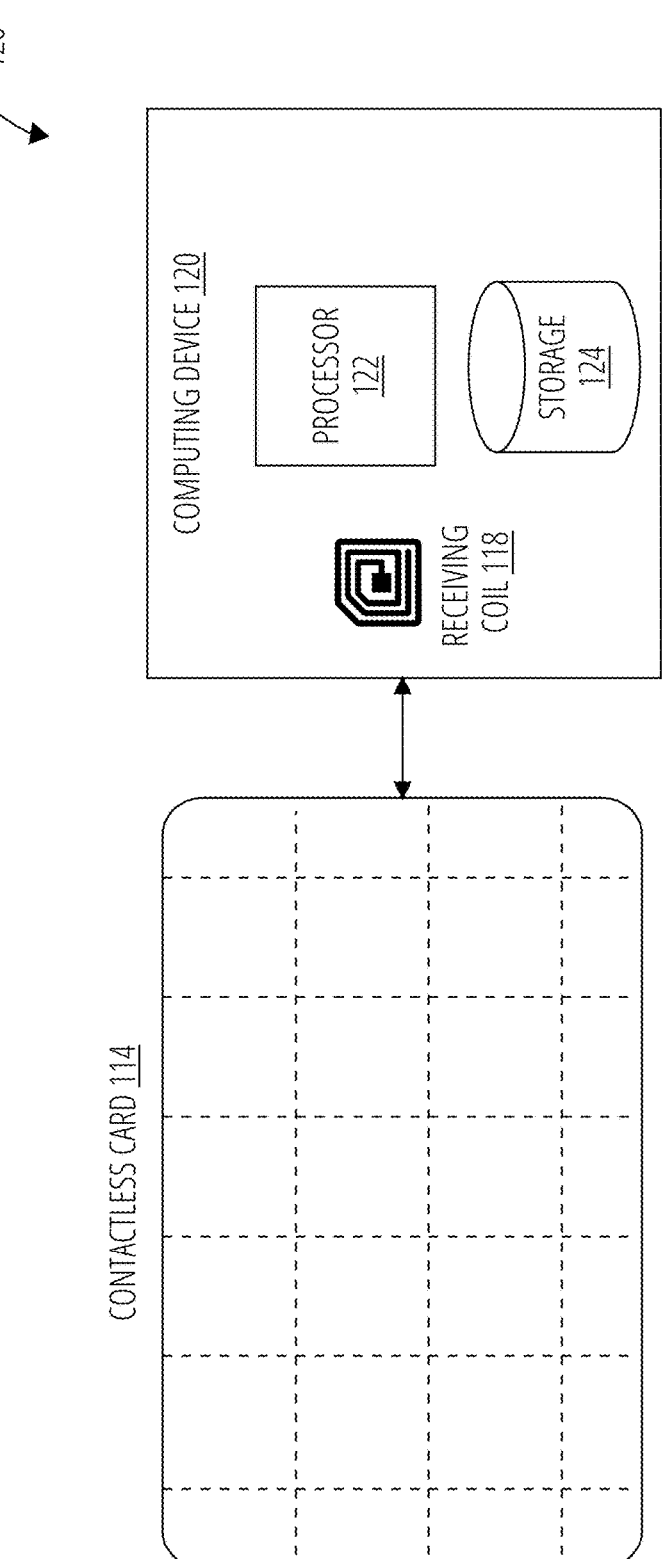
FIG. 1B illustrates another exemplary system for determining readability of contactless cards in a variety of computing environments, according to some implementations of the current subject matter.
Figure 1C:
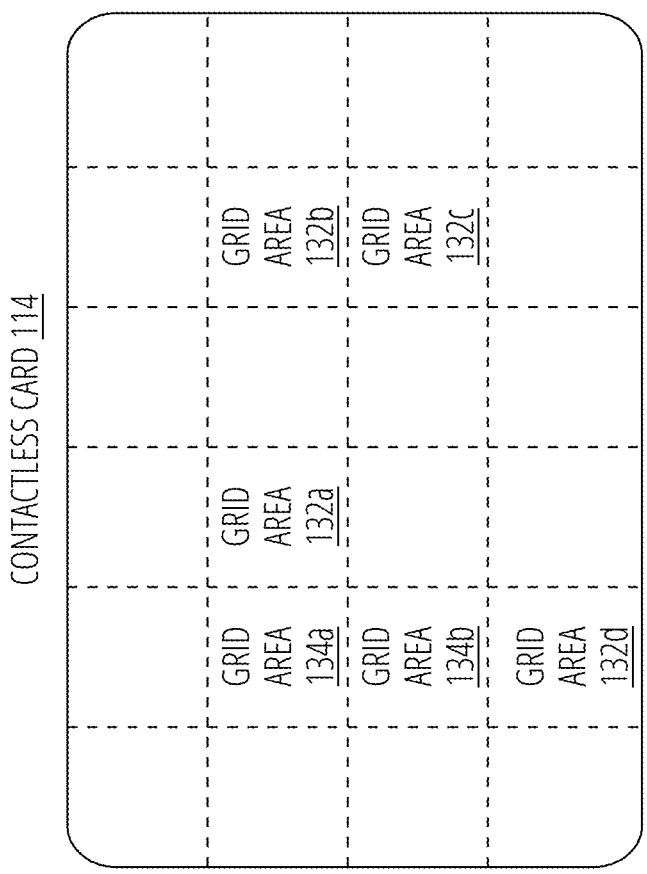
FIG. 1C illustrates an example of a virtual grid for a contactless card, according to some implementations of the current subject matter.

FIGS. 1B-1C illustrate alternate system 126 for determining readability of contactless cards in a variety of computing environments, according to some implementations of the current subject matter. The system 126 may include a computing and/or a first computing device 120 and a computing and/or a contactless card 114. The contactless card 114 may be a contactless card as shown and described in connection with FIGS. 6-15. The computing device 120 may be mobile device (e.g., a smartphone, a mobile telephone, a tablet computer, etc.). The computing device 120 may be a mobile device, a point-of-sale device, a stationary computing device, an automated teller machine (ATM), and/or any other type of computing device. The computing device 120 may be configured to be coupled to various other computing devices, servers, etc. (not shown in FIGS. 1B-1C). One or more components of the system 126 may include any combination of hardware and/or software and/or may be disposed on one or more computing devices, such as, server(s), database(s), personal computer(s), laptop(s), cellular telephone(s), smartphone(s), tablet computer(s), virtual reality devices, and/or any other computing devices and/or any combination thereof. Further, one or more components of the system 126 may be disposed on a single computing device and/or may be part of a single communications network. Alternatively, or in addition to, such services may be separately located from one another.

The system 126 may be configured to be used for guiding the user to position the contactless card 114 proximate to the computing device 120 to achieve strongest signal connection between the contactless card 114 and the computing device 120. This may be accomplished, as discussed above, using a grid locations on the contactless card 114, as shown in FIG. 1C.

As shown in FIG. 1B, the computing device 120 may include a receiving coil 118, a processor 122, and an optional storage location 124. The coil 118 may be coupled to and/or be part of one or more circuits (not shown in FIG. 1B) and/or power sources (not shown in FIG. 1B) that may provide current to the coil 118 and/or detect signals that may be received by the coil 118 from the contactless card 114. As shown in FIG. 1B, the computing device 120 includes a single receiving coil 118, but, as can be understood, more than one coil 118 may be incorporated into the device 120.

The coil 118 may transmit and/or receive one or more signals to/from the contactless card 114. The device 120 may determine signal strength of these signals. For example, the device 120 may measure current that may be supplied to the coil 118 for generation of signals for transmission to the card 114 and/or current produced by the coil 118 as a result, for example, receipt of one or more signals from the card 114. As can be understood, any other measurements and/or signal sensing may be performed for the purposes of determining signal strengths. The data associated with such measurements/sensing may be provided to the processor 122, which may determine signal strengths associated with each signal that may be transmitted/received by the coil 118. The processor 108 may use the signal strength data to rank signal strengths from highest to lowest (and/or vice versa) and determine the location on the card 114 that triggered the strongest signal based on the ranking. The location may be determined in accordance with a virtual grid subdivision (back and/or front) of the card 114, as shown, for example in FIG. 1C.

Using the transmitted/received signals, the processor 122 of the device 120 may determine location proximity (e.g., how far the card 114 is from the coil 118) of the card 114 to the coil 118 based on the determined signal strengths.

Location of the card 114 relative to the coil 118 may be used in determining positional sensitivity of the card 114 with regard to the coil 118, which, in turn, may enable guidance to the user for positioning of the card 114 proximate to the coil 118 to ensure that signals having higher strength are being transmitted/received between the card 114 and device 120, thereby providing more reliable communications.

The device 120 may include a graphical user interface (not shown in FIG. 1B) that may display one or more instructions to the user of the card 114 for positioning/ repositioning of the card 114 so that it is proximate to the coil 118 and/or within a predetermined distance/area of the coil 118. Upon determining that the card 114 is located within the predetermined distance/area of the coil 118, the device 120 may be configured to display an appropriate indication to the user of the card 114 that the card 114 is located within such distance/area of the coil 118 and is ready for communication.

The processor 122 may determine whether the card 114 is positioned within a predetermined distance/area of the coil 118 using a virtual grid associated with the card 114 (as, for example, is shown in FIG. 1C). In some example, non-limiting implementations, the processor 122 may generate a virtual grid having one or more virtual areas and/or squares that may be associated with the contactless card 114. The areas may be used by the processor 122 to scan the card 114 using the receiving coil 118 and identify a location on the card 114 that may cause the receiving coil to establish the strongest connection signal between the card 114 and the computing device 120.

As shown in FIG. 1C, the grid may include one or more areas 132 (*a, b, c, d*) and 134 (*a, b*). As can be understood, there may be any number of areas. Further, while the areas 132 and 134 are shown as rectangles or squares, it is understood that the areas 132, 134 may have any shape, size and the grid may have any number of areas 132, 134. Each area 132, 134 on the card 114 may have the same and/or different dimensions as another area 132, 134. The dimensions and/or positioning of the areas 132, 134 may be predetermined and/or determined by the processor 122. For example, the processor 122 may determine dimensions of the areas 132, 134, their number, position, etc. based on dimensions of the card 114 and/or any other parameters.

In some implementations, the processor 122 may generate the virtual grid so that the areas 132, 134 on the card 114 are uniformly distributed on the back and/or the front of the card 114. The areas 132, 134 on the back of the card 114 may and/or may not overlap with the areas on the front of the card 114. The processor 122 may generate a single grid for both sides of the card and/or may generate separate grids for the back and the front of the card. Scanning of the card may be performed using a specific side of the card 114 and the corresponding virtual grid.

Upon scanning the card 114, the processor 122, based on the signal strengths (determined based on values of current energizing the coil 118) may determine that areas 132 (*a, b, c, d*) produce the weakest signals and areas 134 (*a, b*) produces strongest signals. The processor 122 may then determine that, in view of the weaker signal strengths, areas 132 of the card 114 might not be suitable for providing strongest communication link between the card 114 and the device 120. Alternatively, areas 134, and in particular, for example, area 134*a* may produce the strongest signal. Thus, the processor 122 may cause the device 120 to generate a graphical user interface to guide the user to position the card 114 with the area 134*a* as close as possible to the coil 118. The area 134*a* may, for instance, correspond to the receiving coil or an EMV module on the card 114. As can be understood, the location on the card 114 as identified by the processor 122 as having the strongest signal may be disposed within a single area of the card 114 and/or may span multiple areas (e.g., areas 134a and 134b).

Using the strength of signals associated with each area 132, 134, the processor 122 may determine card's positional sensitivity for each area 132, 134 and/or multiple areas in the grid. The positional sensitivity may correspond to a strength of the signal between the card's receiving coil and the coil 118 of the device 120, which may be determined using a current response of the coil 118 of the device 120. The stronger the signal, the greater the positional sensitivity is for a particular area (e.g., area 134a) on the grid of the card 114. Higher positional sensitivity values may be indicative of the receiving coil of the card 114 to be proximate to and/or located in the area with the greater positional sensitivity. Based on this information, the user may be instructed, via a graphical user interface of the device 120, to move the card 114 to the area (e.g., area 134a) having the higher positional sensitivity value.

As shown in FIG. 1C, the grid may be arranged in rows and columns. For example, one column may have areas 134a, 134b, 132d; another column may have area 132a; etc. Further, one row may have areas 134a, 132a, 132b; another row may have area 134b, 132c; etc. As can be understood, any other arrangement of the grid is possible. The positional sensitivity values may, for instance, be determined for each column and/or for each row (e.g., separately for the front of the card and/or the back of the card). For instance, the positional sensitivity values may be determined as respective average values for each column and each row. For example, assuming the card's grid has 3 rows and 5 columns, positional sensitivity for each row may be determined as $(\frac{1}{5}+\frac{1}{5}+\frac{2}{5})/3=0.2666 \ldots$, and positional sensitivity for each column may be determined as $(0+\frac{1}{3}+\frac{1}{3}+\frac{2}{3}+0)/5=0.2666 \ldots$. As can be understood, any other way of determined positional sensitivity (e.g., using weighting algorithms) may be used.

As stated above, the positional sensitivity values may be displayed on the graphical user interface (GUI) of the device 120 and may indicate to the user whether or not the user is positioning the card 114 (and its coil and/or EMV module) proximate to the coil 118 of the device 120. Alternatively, or in addition, the GUI of the device 120 may display arrows and/or any other graphical indicators determined based on the positional sensitivity values for guiding the user in positioning and/or repositioning the card 114 with respect to the coil 118 of the device 120. Once optimal position of the card 114 (e.g., area 134a of the card 114 being proximate to the coil 118) is achieved (e.g., using highest positional sensitivity value), the device 120 may display an appropriate indicator (e.g., a check mark, etc.) on its GUI, generate an audible alert, display a message, and/or provide any other indication that optimal position of the card has been achieved.

Once such optimal position of the card 114 is achieved, a communication link, e.g., an NFC exchange link, may be established between the card 114 and the device 120. As part of the NFC exchange, the card 114 and the device 120 may exchange various identification data. The identification data may include various information identifying the device 120 and/or user of the device 120, one or more identifiers that may be used to identify the card 114, contactless card data 114, and/or any other data. As stated above, the contactless card data may include, for instance, but is not limited to, at least one of the following: an account number associated with the card, an expiration date associated with the card, a card verification value (CVV) associated with the card, a billing address associated with the card, a name of a user associated with the card, and any combination thereof. The device 120 may then process the data and/or transmit it to one or more servers (not shown in FIG. 1A) for further processing.

FIG. 2 illustrates an exemplary process 200 for increasing readability of a contactless card and/or any other mobile device, according to some implementations of the current subject matter. The process 200 may be executed by the system 100 shown in FIG. 1A and/or any other system. For example, the process 200 may be executed using the device 102 (e.g., a contactless card, another mobile device, etc.) and device 104 (e.g., a mobile device, a stationary device, an automated teller machine, etc.).

At 202, the device 104 may be configured to receive one or more signals from a first device (e.g., device 102). Each of signal may be responsive to one or more transmissions generated and sent by the first device 104 by each receiving coil in a plurality of receiving coils (e.g., coils 106 (*a*, *b*, *c*)). Generation and/or transmission of signals by coils 106 may be executed upon such coils 106 being energized. As stated above, energizing of coils may be performed by virtue of supplying current to the coils 106 from a power source (e.g., a battery, an AC current source, a DC current source, etc.). Each receiving coil 106 may be communicatively coupled to one or more processors (e.g., processor 108 as shown in FIG. 1A).

In some implementations, the receiving coils of the device 104 (e.g., all coils 106) may be energized simultaneously. Once energized, each receiving coil may be configured to generate and send a respective transmission to the device 102. In alternate implementations, the receiving coils 106 may be energized using a predetermined order (e.g., coil 106a may be energized first, coil 106b—second, coil 106c—third, etc.). In that regard, upon being energized, each such receiving coil may be configured to generate and send a respective transmission to the device 102 using such predetermined order.

In some implementations, as shown in FIG. 1A, the coils 106 may be arranged in an array (e.g., array 110). Further, the coils may be positioned in the device 104 using a predetermined pattern and/or arrangement. The device 104 may be configured to include any number of receiving coils 106.

At 204, the device 104 may be configured to determine a signal strength of each of the signals received from the first device. The signal strength determination may be based on measurement of current at each receiving coil 106. Current measurement may be accomplished using one or more sensors, sensor circuits and/or any other components of the device 104. The measured current data may be provided to the processor 108 to make an assessment as to the strength of each signal received and/or transmitted by each coil 106. The processor 108 may also rank the determined signal strengths from highest to lowest while keeping track of which coil 106 is associated with which signal strength.

At 206, the processor 108 may be configured to identify a first signal having a highest signal strength based on determined signal strengths of the one or more signals and select a first receiving coil 106 (e.g., coil 106a) that may correspond to the first signal, at 208. Selection of the specific coil 106 may be performed for the purposes of using the selected coil for establishing communication between the device 102 and the device 104.

Once the specific receiving coil has been identified, all coils may be de-energized, at 210. De-energizing a receiving coil may involve, for example, preventing supply of current to the coil from a current source. Alternatively, or in addition, the selected receiving coil may remain energized, while other coils 106 may be de-energized. Yet, in further alternative implementations, the coils 106 that have not been selected may remain energized, but not used for further transmission and/or reception of signals. Further, to prevent interference from the non-selected receiving coils 106, one or more filters may be used to block and/or filter out signals from such non-selected coils.

At 212, the processor 108 may be configured to energize (e.g., turn on supply of current from a current source) the selected first receiving coil. Energizing the selected coil may allow the coil to transmit and/or receive signals to and/or from the device 102. The energized coil may be used to establish a communication with the device 102.

In some implementations, the communication may be established through a near-field communications (NFC) exchange and/or interface. As can be understood, any other type of communication between devices 102 and 104 (e.g., a contactless card and a mobile device, a mobile device and another mobile device, etc.) may be established. Once the communication is established the first device, e.g., device 102, such as a contactless card, may send various data, e.g., contactless card data, to the device 104. Such contactless card data may include at least one of the following: an account number associated with the contactless card, an expiration date associated with the contactless card, a card verification value (CVV) associated with the contactless card, a billing address associated with the contactless card, a name of a user associated with the contactless card, and any combination thereof. Further, in the non-limiting implementation of the contactless card, such card may, for instance, be at least one of the following: a credit card, a debit card, an electronic gift card, a pre-paid credit card, a pre-paid debit card, and any combination thereof.

In some implementations, as discussed above, the strengths of signals determined by the device 104 may be used to determine one or more positions of the device 102 in relation to each receiving coil 106. For example, the stronger the signal, the closer the device 102 may be to a particular receiving coil 106; and oppositely, the weaker the signal, the farther away the device 102 may be from a particular coil 106. Moreover, a particular position (e.g., a first position) of the device 102 may be selected based on the determination of distances from each coil 106. The selected position may be configured to correspond to the device 102 being proximate to the receiving coil 106 that has been selected as corresponding to the highest signal strength. Moreover, the position may also correspond to the device 102 being distal to the remaining receiving coils 106.

Moreover, as discussed above, the current subject matter may be configured to generate an indication (e.g., to a user of the device 102) to position and/or reposition of the device 102 in accordance with the selected position. The indication may be displayed on a graphical user interface that may be part of the device 102.

FIG. 3 illustrates another exemplary process 300 for increasing readability of a contactless card and/or any other mobile device, according to some implementations of the current subject matter. Similar to the process 200, the process 300 may also be executed by the system 100 shown in FIG. 1A and/or any other system, e.g., using the device 102 (e.g., a contactless card, another mobile device, etc.) and device 104 (e.g., a mobile device, a stationary device, an automated teller machine, etc.).

At 302, the processor 108 of the device 104 may be configured to determine one or more positions of a first device (e.g., device 102) in relation to each of the plurality of receiving coils 106 of the device 104.

Figure 4:
FIG. 4 illustrates an exemplary process for making a determination of a position of a contactless card, according to some implementations of the current subject matter.

FIG. 4 illustrates an exemplary process 400 for making a determination of a position of a contactless card (e.g., device 102 as shown in FIG. 1A and/or contactless card 114 as shown in FIG. 1B), according to some implementations of the current subject matter. At 402, the device 104, as shown in FIG. 1A, and/or device 120, as shown in FIG. 1B, may be configured to receive one or more signals from the device 102 and/or card 114, respectively. The signals may be responsive to one or more transmissions generated and sent to the device 102 and/or device 120 by a respective receiving coil 106 (as shown in FIG. 1A) and/or receiving coil 118 (as shown in FIG. 1B), where the coil may have been energized for such generation/transmission. Alternatively, or in addition, the signals may be transmitted to the device 102 and/or card 114, respectively.

At 404, the processor 108 of the device 104 and/or the processor 122 of the device 120 may be configured to determine signal strength of the received signals. Alternatively, or in addition, the processor 108 and/or 122 may be configured to make such determination based on signals that are transmitted to the device 102 and/or card 114, respectively. The signals strengths may be determined based on current measured at one or more receiving coils 106 of the device 104 and/or the coil 118 of the device 120, respectively. The determined signal strengths may then be used to ascertain one or more positions of the device 102 in relation to the device 104, and in particular, in relation to each of the coils 106, and/or alternatively of the card 114 in relation to the device 120, and, specifically, its coil 118, at 406. As shown in FIGS. 1B and 1C, the determination of the signal strengths, and, hence, positional sensitivity values associated with the card 114 may be made using a virtual grid having one or more areas 132, 134, as shown in FIG. 1C.

Referring back to FIG. 3, at 304, the processor 108 may be configured to identify a signal having a highest signal strength among the determined signal strengths of signals. The determination of the highest signal strength may be made based on current measurements and/or detections at each of the receiving coils 106. Higher values of current may correspond to higher signals strengths.

At 306, the processor 108 may be configured to select a specific receiving coil (e.g., a first coil) 106 (e.g., 106a) that may correspond to the signal having the highest signal strength. The processor 108 may then determine a position of the device 102 that may correspond to the most proximate one to the selected receiving coil. Using that information, the processor 108 may generate an indication (e.g., to the user) to reposition the device 102 to the determined position.

FIG. 5 illustrates yet another exemplary process 500 for increasing readability of a contactless card and/or any other mobile device, according to some implementations of the current subject matter. Similar to the above processes shown in FIGS. 2-4, the system 100 shown in FIG. 1A and/or any other system may be configured to execute process 500. The process 500 may involve devices 102 (e.g., a contactless card, another mobile device, etc.) and 104 (e.g., a mobile device, a stationary device, an automated teller machine, etc.) as shown in FIG. 1A.

At 502, the device 104 may be configured to determine a signal strength of each of one or more signals received from the device 102 (e.g., "first device"). Each of the signals may be responsive to one or more transmissions generated and sent to the device 102 by one or more receiving coils 106 upon such coils being energized (e.g., supplied current to).

At 504, the device 104 may be configured to identify a first signal in the above signals that may have the highest signal strength. The determination may be made based on determined signal strengths of each of the signals.

At 506, the device 104 may be configured to select a particular receiving coil 106 (e.g., "first receiving coil") that may correspond to the identified signal and then, de-energize the plurality of receiving coils, at 508.

At 510, the device 104 may be configured to energize only the selected receiving coil and, use the energized coil to establish a communication with the device 102.

FIG. 6 illustrates a data transmission system 600 according to an example embodiment. As further discussed below, system 600 may include contactless card 602, client device 604, network 606, and server 608. Although FIG. 6 illustrates single instances of the components, system 600 may include any number of components.

System 600 may include one or more contactless cards 602, which are further explained below. In some embodiments, contactless card 602 may be in wireless communication, utilizing NFC in an example, with client device 604.

System 600 may include client device 604, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. client device 104 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 604 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 604 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some implementations, client device 604 of system 600 may execute one or more applications, such as software applications, that enable, for example, network communications with one or more components of system 600 and transmit and/or receive data.

The client device 604 may be in communication with one or more server(s) 608 via one or more network(s) 606 and may operate as a respective front-end to back-end pair with server 608. The client device 604 may transmit, for example from a mobile device application executing on client device 604, one or more requests to server 608. The one or more requests may be associated with retrieving data from server 608. The server 608 may receive the one or more requests from client device 604. Based on the one or more requests from client device 604, server 608 may be configured to retrieve the requested data from one or more databases (not shown). Based on receipt of the requested data from the one or more databases, server 608 may be configured to transmit the received data to client device 604, the received data being responsive to one or more requests.

System 600 may include one or more networks 606. In some implementations, network 606 may be one or more of a wireless network, a wired network or any combination of wireless network and wired network and may be configured to connect client device 604 to server 608. For example, network 606 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1302.11 family of networking, Bluetooth, NFC, Radio Frequency Identification (RFID), Wi-Fi, and/or the like.

In addition, network 606 may include, without limitation, telephone lines, fiber optics, IEEE Ethernet 802.3, a wide area network, a wireless personal area network, a LAN, or a global network such as the Internet. In addition, network 606 may support an Internet network, a wireless communication network, a cellular network, or the like, or any combination thereof, network 606 may further include one network, or any number of the exemplary types of networks mentioned above, operating as a stand-alone network or in cooperation with each other, network 606 may utilize one or more protocols of one or more network elements to which they are communicatively coupled, network 606 may translate to or from other protocols to one or more protocols of network devices. Although network 606 is depicted as a single network, it should be appreciated that according to one or more examples, network 606 may comprise a plurality of interconnected networks, such as, for example, the Internet, a service provider's network, a cable television network, corporate networks, such as credit card association networks, and home networks.

System 600 may include one or more servers 608. In some implementations, server 608 may include one or more processors, which are coupled to memory. The server 608 may be configured as a central system, server or platform to control and call various data at different times to execute a plurality of workflow actions. Server 120 may be configured to connect to the one or more databases. The server 608 may be connected to at least one client device 604.

Figure 7:
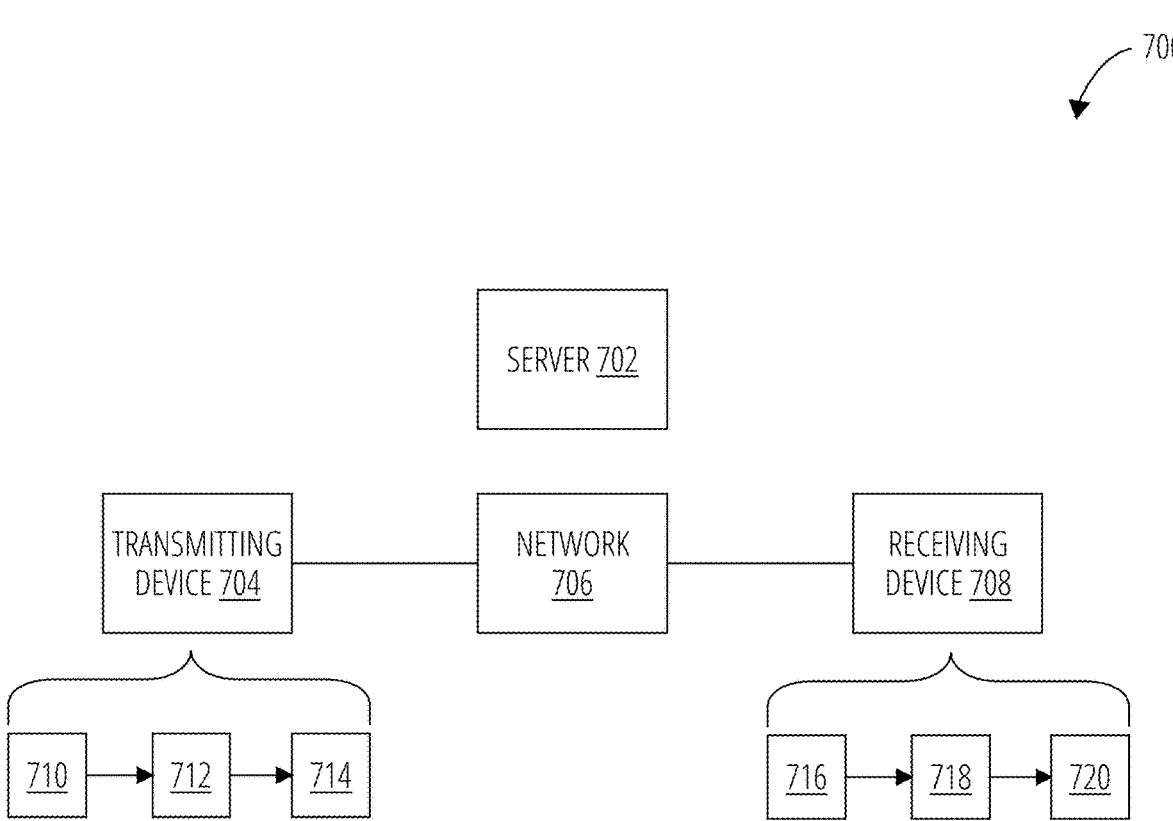
FIG. 7 illustrates an aspect of the subject matter, according to some implementations.

FIG. 7 illustrates a data transmission system according to an example embodiment. System 700 may include a transmitting or transmitting device 704, a receiving or receiving device 708 in communication, for example via network 706, with one or more servers 702. The devices 704, 708 may be similar to one or more devices 102, 104 shown in FIG. 1A. Although FIG. 7 shows single instances of components of system 700, system 700 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be compromised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 7, system 700 may be configured to implement key diversification. For example, a sender and recipient may desire to exchange data (e.g., original sensitive data) via respective devices 704 and 708. As explained above, although single instances of transmitting device 704 and receiving device 708 may be included, it is understood that one or more transmitting devices 704 and one or more receiving devices 708 may be involved so long as each party shares the same shared secret symmetric key. In some implementations, the transmitting device 704 and receiving device 708 may be provisioned with the same master symmetric key. Further, it is understood that any party or device holding the same secret symmetric key may perform the functions of the transmitting device 704 and similarly any party holding the same secret symmetric key may perform the functions of the receiving device 708. In some implementations, the symmetric key may comprise the shared secret symmetric key which is kept secret from all parties other than the transmitting device 704 and the receiving device 708 involved in exchanging the secure data. It is further understood that both the transmitting device 704 and receiving device 708 may be provided with the same master symmetric key, and further that part of the data exchanged between the transmitting device 704 and receiving device 708 comprises at least a portion of data which may be referred to as the counter value. The counter value may comprise a number that changes each time data is exchanged between the transmitting device 704 and the receiving device 708.

System 700 may include one or more networks 706. In some implementations, network 706 may be one or more of a wireless network, a wired network or any combination of wireless network and wired network and may be configured to connect one or more transmitting devices 704 and one or more receiving devices 708 to server 702. For example, network 706 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1302.11 family network, Bluetooth, NFC, RFID, Wi-Fi, and/or the like.

In addition, network 706 may include, without limitation, telephone lines, fiber optics, IEEE Ethernet 1402.3, a wide area network, a wireless personal area network, a LAN, or a global network such as the Internet. In addition, network 706 may support an Internet network, a wireless communication network, a cellular network, or the like, or any combination thereof. Network 706 may further include one network, or any number of the exemplary types of networks mentioned above, operating as a stand-alone network or in cooperation with each other. Network 706 may utilize one or more protocols of one or more network elements to which they are communicatively coupled. Network 706 may translate to or from other protocols to one or more protocols of network devices. Although network 706 is depicted as a single network, it should be appreciated that according to one or more examples, network 706 may comprise a plurality of interconnected networks, such as, for example, the Internet, a service provider's network, a cable television network, corporate networks, such as credit card association networks, and home networks.

In some implementations, one or more transmitting devices 704 and one or more receiving devices 708 may be configured to communicate and transmit and receive data between each other without passing through network 706. For example, communication between the one or more transmitting devices 704 and the one or more receiving devices 708 may occur via at least one of NFC, Bluetooth, RFID, Wi-Fi, and/or the like.

At block 710, when the transmitting device 704 is preparing to process the sensitive data with symmetric cryptographic operation, the sender may update a counter. In addition, the transmitting device 704 may select an appropriate symmetric cryptographic algorithm, which may include at least one of a symmetric encryption algorithm, HMAC algorithm, and a CMAC algorithm. In some implementations, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 712, the transmitting device 704 may take the selected cryptographic algorithm, and using the master symmetric key, process the counter value. For example, the sender may select a symmetric encryption algorithm, and use a counter which updates with every conversation between the transmitting device 704 and the receiving device 708. The transmitting device 704 may then encrypt the counter value with the selected symmetric encryption algorithm using the master symmetric key, creating a diversified symmetric key.

In some implementations, the counter value may not be encrypted. In these examples, the counter value may be transmitted between the transmitting device 704 and the receiving device 708 at block 712 without encryption.

At block 714, the diversified symmetric key may be used to process the sensitive data before transmitting the result to the receiving device 708. For example, the transmitting device 704 may encrypt the sensitive data using a symmetric encryption algorithm using the diversified symmetric key, with the output comprising the protected encrypted data. The transmitting device 704 may then transmit the protected encrypted data, along with the counter value, to the receiving device 708 for processing.

At block 716, the receiving device 708 may first take the counter value and then perform the same symmetric encryption using the counter value as input to the encryption, and the master symmetric key as the key for the encryption. The output of the encryption may be the same diversified symmetric key value that was created by the sender.

At block 718, the receiving device 708 may then take the protected encrypted data and using a symmetric decryption algorithm along with the diversified symmetric key, decrypt the protected encrypted data.

At block 720, as a result of decrypting the protected encrypted data, the original sensitive data may be revealed.

The next time sensitive data needs to be sent from the sender to the recipient via respective transmitting device 704 and receiving device 708, a different counter value may be selected producing a different diversified symmetric key. By processing the counter value with the master symmetric key and same symmetric cryptographic algorithm, both the transmitting device 704 and receiving device 708 may independently produce the same diversified symmetric key. This diversified symmetric key, not the master symmetric key, is used to protect the sensitive data.

As explained above, both the transmitting device 704 and receiving device 708 each initially possess the shared master symmetric key. The shared master symmetric key is not used to encrypt the original sensitive data. Because the diversified symmetric key is independently created by both the transmitting device 704 and receiving device 708, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 704 and the receiving device 708 may be governed by symmetric requirements for how often to create a new diversification value, and therefore a new diversified symmetric key. In an embodiment, a new diversification value and therefore a new diversified symmetric key may be created for every exchange between the transmitting device 704 and receiving device 708.

In some implementations, the key diversification value may comprise the counter value. Other non-limiting examples of the key diversification value include: a random nonce generated each time a new diversified key is needed, the random nonce sent from the transmitting device 704 to the receiving device 708; the full value of a counter value sent from the transmitting device 704 and the receiving device 708; a portion of a counter value sent from the transmitting device 704 and the receiving device 708; a counter independently maintained by the transmitting device 704 and the receiving device 708 but not sent between the two devices; a one-time-passcode exchanged between the transmitting device 704 and the receiving device 708; and a cryptographic hash of the sensitive data. In some implementations, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 704 and the receiving device 708. In effect, this may create a one-time use key, such as a single-use session key.

Figure 8:
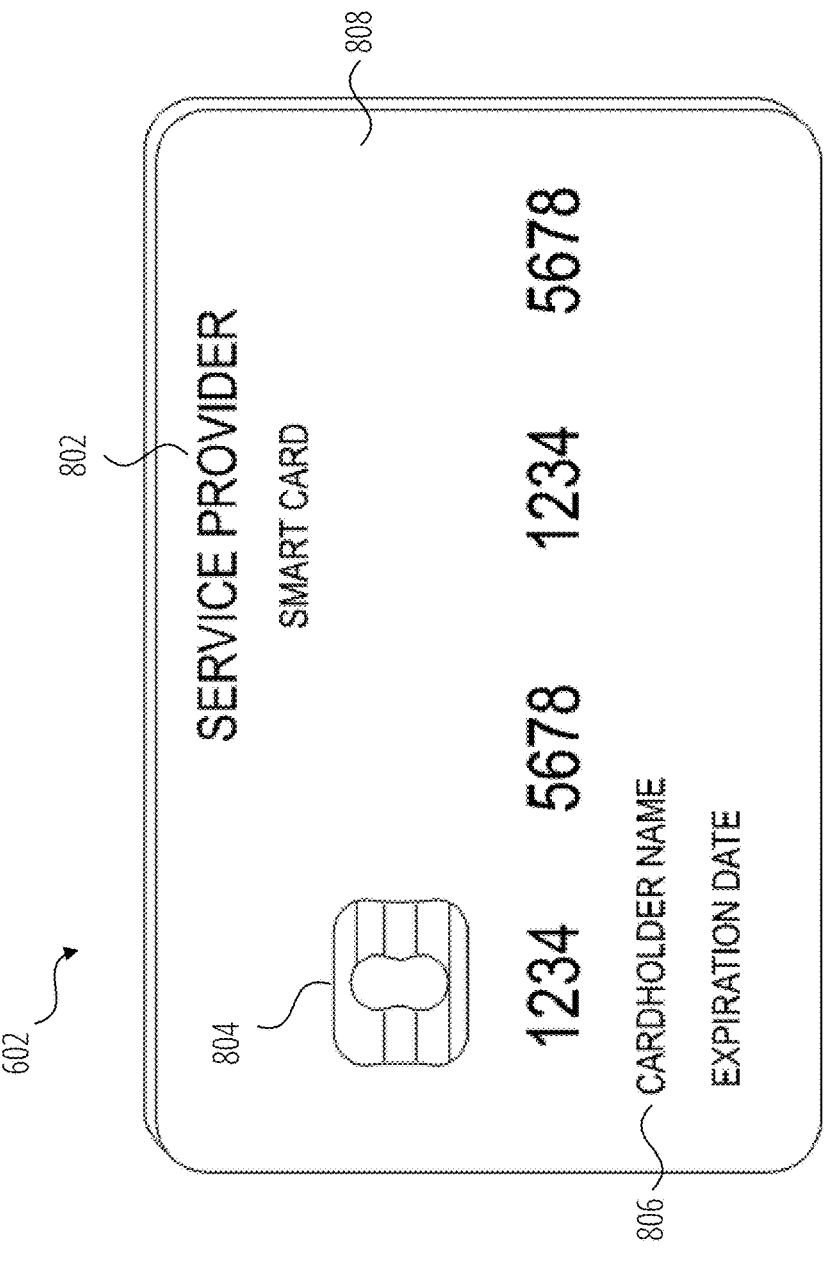
FIG. 8 illustrates a contactless card, according to some implementations of the current subject matter.
Figure 9:
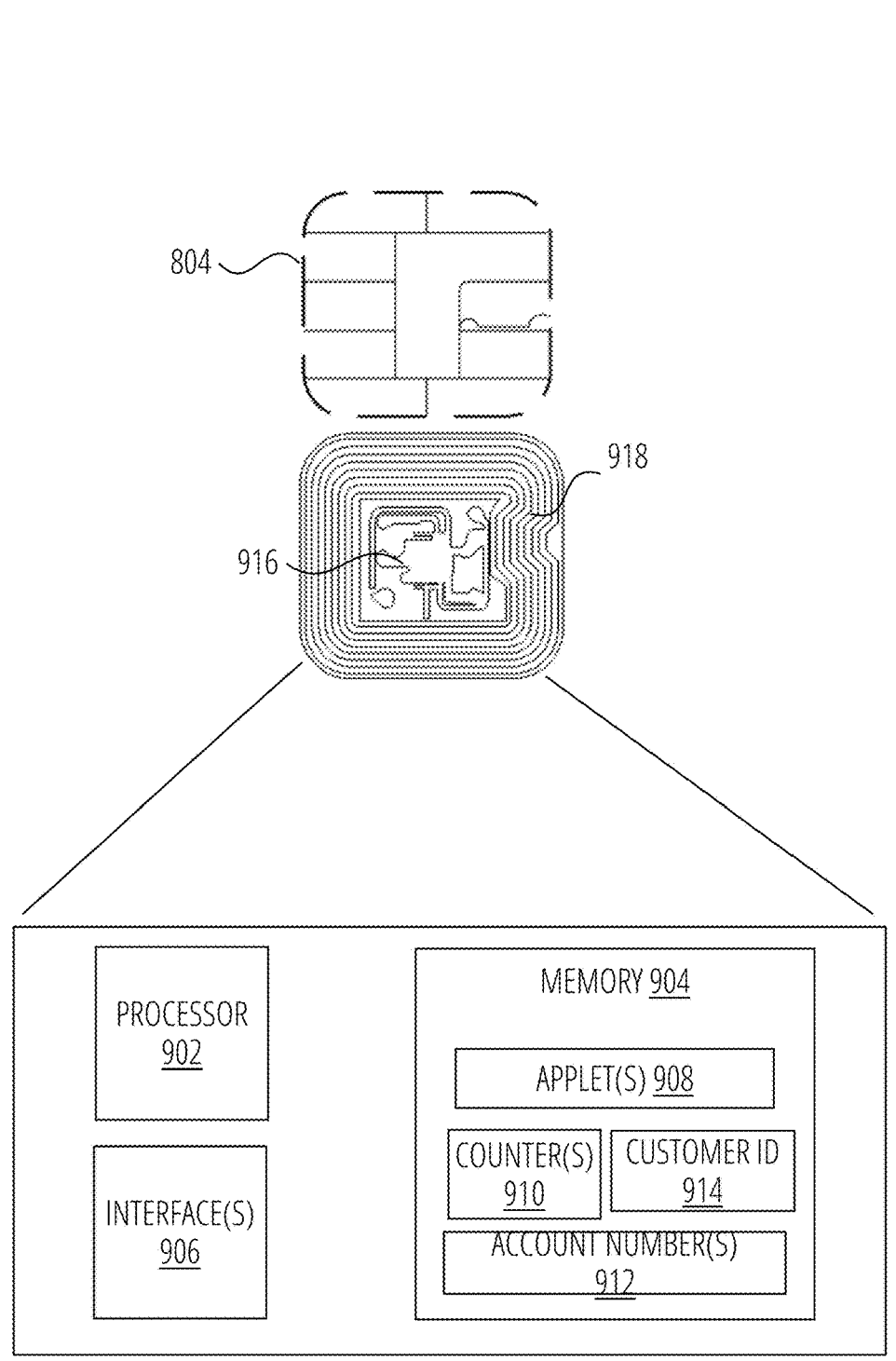
FIG. 9 illustrates a transaction card component, according to some implementations of the current subject matter.

FIG. 8 illustrates an example configuration of a contactless card 602, which may include a contactless card, a payment card, such as a credit card, debit card, or gift card, issued by a service provider as displayed as service provider indicia 802 on the front or back of the contactless card 602. In some implementations, the contactless card 602 is not related to a payment card, and may include, without limitation, an identification card. In some implementations, the transaction card may include a dual interface contactless payment card, a rewards card, and so forth. The contactless card 602 may include a substrate 808, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some implementations, the contactless card 602 may have physical characteristics compliant with the ID-1 format of the ISO/IEC 7816 standard, and the transaction card may otherwise be compliant with the ISO/IEC 14443 standard. However, it is understood that the contactless card 602 according to the present disclosure may have different characteristics, and the present disclosure does not require a transaction card to be implemented in a payment card.

The contactless card 602 may also include identification information 806 displayed on the front and/or back of the card, and a contact pad 804. The contact pad 804 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 602 may also include processing circuitry, antenna and other components as will be further discussed in FIG. 9. These components may be located behind the contact pad 804 or elsewhere on the substrate 808, e.g., within a different layer of the substrate 808, and may electronically and physically coupled with the contact pad 804. The contactless card 602 may also include a magnetic strip or tape, which may be located on the back of the card (not shown in FIG. 8). The contactless card 602 may also include a Near-Field Communication (NFC) device coupled with an antenna capable of communicating via the NFC protocol. Embodiments are not limited in this manner.

As illustrated in FIG. 2, the contact pad 804 of contactless card 602 may include processing circuitry 916 for storing, processing, and communicating information, including a processor 902, a memory 904, and one or more interface(s) 906. It is understood that the processing circuitry 916 may contain additional components, including processors, memories, error and parity/CRC checkers, data encoders, anticollision algorithms, controllers, command decoders, security primitives and tamperproofing hardware, as necessary to perform the functions described herein.

The memory 904 may be a read-only memory, write-once read-multiple memory or read/write memory, e.g., RAM, ROM, and EEPROM, and the contactless card 602 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 904 may be encrypted memory utilizing an encryption algorithm executed by the processor 902 to encrypted data.

The memory 904 may be configured to store one or more applet(s) 908, one or more counter(s) 910, a customer identifier 914, and the account number(s) 912, which may be virtual account numbers. The one or more applet(s) 908 may comprise one or more software applications configured to execute on one or more contactless cards, such as a Java® Card applet. However, it is understood that applet(s) 908 are not limited to Java Card applets, and instead may be any software application operable on contactless cards or other devices having limited memory. The one or more counter(s) 910 may comprise a numeric counter sufficient to store an integer. The customer identifier 914 may comprise a unique alphanumeric identifier assigned to a user of the contactless card 602, and the identifier may distinguish the user of the contactless card from other contactless card users. In some implementations, the customer identifier 914 may identify both a customer and an account assigned to that customer and may further identify the contactless card 602 associated with the customer's account. As stated, the account number(s) 912 may include thousands of one-time use virtual account numbers associated with the contactless card 602. An applet(s) 908 of the contactless card 602 may be configured to manage the account number(s) 912 (e.g., to select an account number(s) 912, mark the selected account number(s) 912 as used, and transmit the account number(s) 912 to a mobile device for autofilling by an autofilling service.

The processor 902 and memory elements of the foregoing exemplary embodiments are described with reference to the contact pad 804, but the present disclosure is not limited thereto. It is understood that these elements may be implemented outside of the contact pad 804 or entirely separate from it, or as further elements in addition to processor 902 and memory 904 elements located within the contact pad 804.

In some implementations, the contactless card 602 may comprise one or more antenna(s) 918. The one or more antenna(s) 918 may be placed within the contactless card 602 and around the processing circuitry 916 of the contact pad 804. For example, the one or more antenna(s) 918 may be integral with the processing circuitry 916 and the one or more antenna(s) 918 may be used with an external booster coil. As another example, the one or more antenna(s) 918 may be external to the contact pad 804 and the processing circuitry 916.

In an embodiment, the coil of contactless card 602 may act as the secondary of an air core transformer. The terminal may communicate with the contactless card 602 by cutting power or amplitude modulation. The contactless card 101 may infer the data transmitted from the terminal using the gaps in the contactless card's power connection, which may be functionally maintained through one or more capacitors. The contactless card 602 may communicate back by switching a load on the contactless card's coil or load modulation. Load modulation may be detected in the terminal's coil through interference. More generally, using the antenna(s) 918, processor 902, and/or the memory 904, the contactless card 101 provides a communications interface to communicate via NFC, Bluetooth, and/or Wi-Fi communications.

As explained above, contactless card 602 may be built on a software platform operable on smart cards or other devices having limited memory, such as JavaCard, and one or more applications or applets may be securely executed. Applet(s) 908 may be added to contactless cards to provide a one-time password (OTP) for multifactor authentication (MFA) in various mobile application-based use cases. Applet(s) 908 may be configured to respond to one or more requests, such as near field data exchange requests, from a reader, such as a mobile NFC reader (e.g., of a mobile device or point-of-sale terminal) and produce an NDEF message that comprises a cryptographically secure OTP encoded as an NDEF text tag.

One example of an NDEF OTP is an NDEF short-record layout (SR=1). In such an example, one or more applet(s) 908 may be configured to encode the OTP as an NDEF type 4 well known type text tag. In some implementations, NDEF messages may comprise one or more records. The applet(s) 908 may be configured to add one or more static tag records in addition to the OTP record.

In some implementations, the one or more applet(s) 908 may be configured to emulate an RFID tag. The RFID tag may include one or more polymorphic tags. In some implementations, each time the tag is read, different cryptographic data is presented that may indicate the authenticity of the contactless card. Based on the one or more applet(s) 908, an NFC read of the tag may be processed, the data may be transmitted to a server, such as a server of a banking system, and the data may be validated at the server.

In some implementations, the contactless card 602 and server may include certain data such that the card may be properly identified. The contactless card 602 may include one or more unique identifiers (not pictured). Each time a read operation takes place, the counter(s) 910 may be configured to increment. In some implementations, each time data from the contactless card 602 is read (e.g., by a mobile device), the counter(s) 910 is transmitted to the server for validation and determines whether the counter(s) 910 are equal (as part of the validation) to a counter of the server.

The one or more counter(s) 910 may be configured to prevent a replay attack. For example, if a cryptogram has been obtained and replayed, that cryptogram is immediately rejected if the counter(s) 910 has been read or used or otherwise passed over. If the counter(s) 910 has not been used, it may be replayed. In some implementations, the counter that is incremented on the card is different from the counter that is incremented for transactions. The contactless card 101 is unable to determine the application transaction counter(s) 910 since there is no communication between applet(s) 908 on the contactless card 602.

In some implementations, the counter(s) 910 may get out of sync. In some implementations, to account for accidental reads that initiate transactions, such as reading at an angle, the counter(s) 910 may increment but the application does not process the counter(s) 910. In some implementations, when the mobile device 10 is woken up, NFC may be enabled and the device 110 may be configured to read available tags, but no action is taken responsive to the reads.

To keep the counter(s) 910 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 910 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 910 increases in the appropriate sequence, then it is possible to know that the user has done so.

The key diversification technique described herein with reference to the counter(s) 910, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 602, two cryptographic keys may be assigned uniquely per card. The cryptographic keys may comprise symmetric keys which may be used in both encryption and decryption of data. Triple DES (3DES) algorithm may be used by EMV, and it is implemented by hardware in the contactless card 602. By using the key diversification process, one or more keys may be derived from a master key based upon uniquely identifiable information for each entity that requires a key.

In some implementations, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some implementations, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 10:
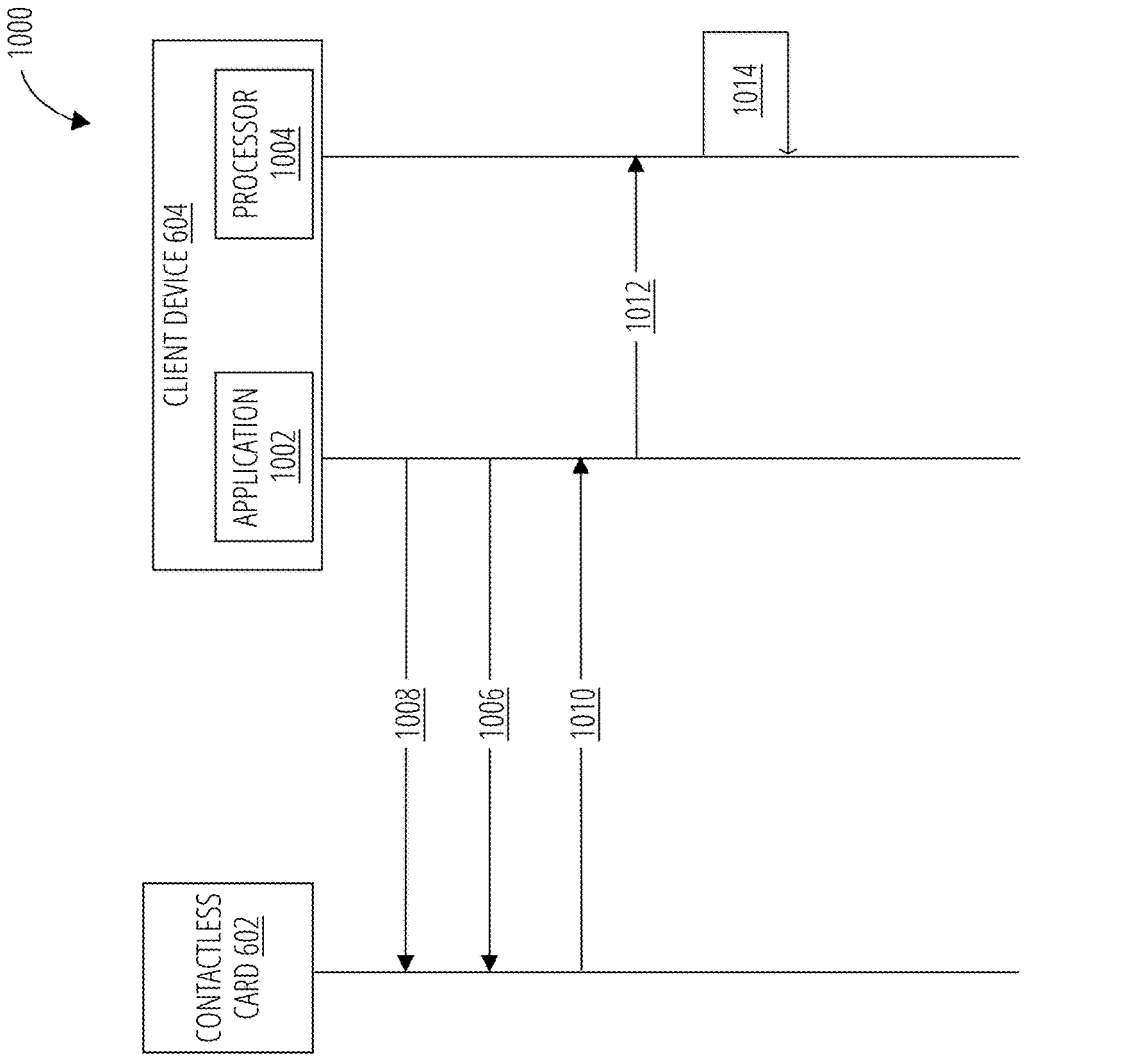
FIG. 10 illustrates a sequence flow, according to some implementations of the current subject matter.

FIG. 10 is a timing diagram illustrating an example sequence for providing authenticated access according to one or more embodiments of the present disclosure. Sequence flow 1000 may include contactless card 602 and client device 604, which may include an application 1002 and processor 1004.

At line 1008, the application 1002 communicates with the contactless card 602 (e.g., after being brought near the contactless card 602). Communication between the application 1002 and the contactless card 602 may involve the contactless card 602 being sufficiently close to a card reader (not shown) of the client device 604 to enable NFC data transfer between the application 1002 and the contactless card 602.

At line 1006, after communication has been established between client device 604 and contactless card 602, contactless card 602 generates a message authentication code (MAC) cryptogram. In some implementations, this may occur when the contactless card 602 is read by the application 1002. In particular, this may occur upon a read, such as an NFC read, of a near field data exchange (NDEF) tag, which may be created in accordance with the NFC Data Exchange Format. For example, a reader application, such as application 1002, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 602 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some implementations, the MAC cryptogram may be transmitted as an NDEF tag, and in other examples the MAC cryptogram may be included with a uniform resource indicator (e.g., as a formatted string). In some implementations, application 1002 may be configured to transmit a request to contactless card 602, the request comprising an instruction to generate a MAC cryptogram.

At line 1010, the contactless card 602 sends the MAC cryptogram to the application 1002. In some implementations, the transmission of the MAC cryptogram occurs via NFC, however, the present disclosure is not limited thereto. In other examples, this communication may occur via Bluetooth, Wi-Fi, or other means of wireless data communication. At line 1012, the application 1002 communicates the MAC cryptogram to the processor 1004.

At line 1014, the processor 1004 verifies the MAC cryptogram pursuant to an instruction from the application 122. For example, the MAC cryptogram may be verified, as explained below. In some implementations, verifying the MAC cryptogram may be performed by a device other than client device 604, such as a server of a banking system in data communication with the client device 604. For example, processor 1004 may output the MAC cryptogram for transmission to the server of the banking system, which may verify the MAC cryptogram. In some implementations, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 11:
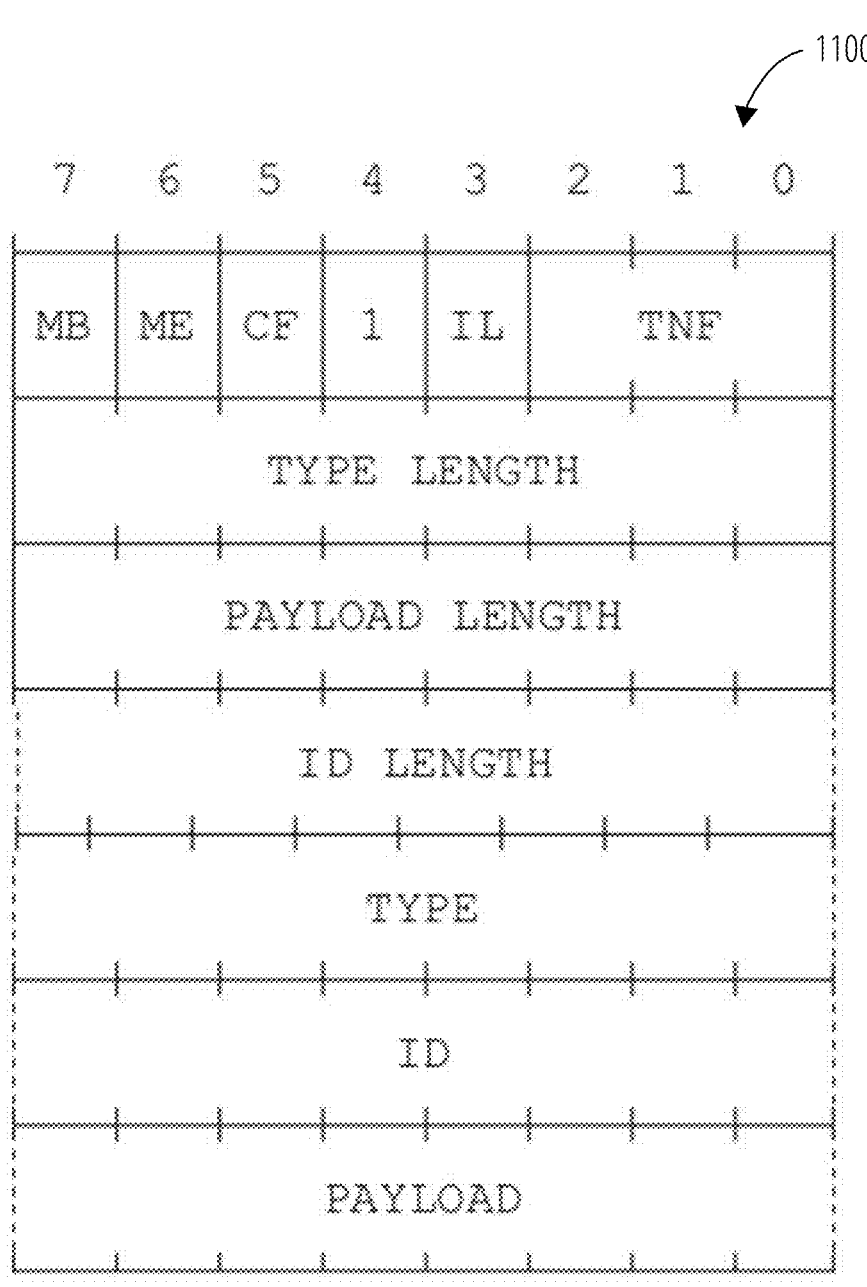
FIG. 11 illustrates a data structure, according to some implementations of the current subject matter.

FIG. 11 illustrates an NDEF short-record layout (SR=1) data structure 1100 according to an example embodiment. One or more applets may be configured to encode the OTP as an NDEF type 4 well known type text tag. In some implementations, NDEF messages may comprise one or more records. The applets may be configured to add one or more static tag records in addition to the OTP record. Exemplary tags include, without limitation, Tag type: well-known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 12 illustrates a diagram of a system 1200 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV, and it is implemented by hardware in the contactless card. By using a key diversification process, one or more keys may be derived from a master key based upon uniquely identifiable information for each entity that requires a key.

Regarding master key management, two issuer master keys 1202, 1226 may be required for each part of the portfolio on which the one or more applets is issued. For example, the first master key 1202 may comprise an Issuer Cryptogram Generation/Authentication Key (Iss-Key-Auth) and the second master key 1226 may comprise an Issuer Data Encryption Key (Iss-Key-DEK). As further explained herein, two issuer master keys 1202, 1226 are diversified into card master keys 1208, 1220, which are unique for each card. In some implementations, a network profile record ID (pNPR) 522 and derivation key index (pDKI) 1224, as back-office data, may be used to identify which Issuer Master Keys 1202, 1226 to use in the cryptographic processes for authentication. The system performing the authentication may be configured to retrieve values of pNPR 1222 and pDKI 1224 for a contactless card at the time of authentication.

In some implementations, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1208 and Card-Key-Dek 1220). The session keys (Aut-Session-Key 1232 and DEK-Session-Key 1210) may be generated by the one or more applets and derived by using the application transaction counter (pATC) 1204 with one or more algorithms. To fit data into the one or more algorithms, only the 2 low order bytes of the 4-byte pATC 1204 is used. In some implementations, the four byte session key derivation method may comprise: F1:=PATC(lower 2 bytes) ‖'F0'‖'00'‖PATC(four bytes) F1:=PATC(lower 2 bytes) ‖'0F'‖'00'‖PATC(four bytes) SK:={(ALG(MK)[F1])‖ALG (MK)[F2]}, where ALG may include 3DES ECB and MK may include the card's unique derived master key.

As described herein, one or more MAC session keys may be derived using the lower two bytes of pATC 1204 counter. At each tap of the contactless card, pATC 1204 is configured to be updated, and the card master keys Card-Key-AUTH 508 and Card-Key-DEK 1220 are further diversified into the session keys Aut-Session-Key 1232 and DEK-Session-KEY 1210. pATC 1204 may be initialized to zero at personalization or applet initialization time. In some implementations, the pATC counter 1204 may be initialized at or before personalization and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some implementations, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some implementations, only the authentication data and an 8-byte random number followed by MAC of the authentication data may be included. In some implementations, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 1232. The data specified in cryptogram may be processed with javacard.signature method:

ALG_DES_MAC8_ISO9797_1_M2_ALG3 to correlate to EMV ARQC verification methods. The key used for this computation may comprise a session key AUT-Session-Key 1232, as explained above. As explained above, the low order two bytes of the counter may be used to diversify for the one or more MAC session keys. As explained below, AUT-Session-Key 1232 may be used to MAC data 1206, and the resulting data or cryptogram A 1214 and random number RND may be encrypted using DEK-Session-Key 1210 to create cryptogram B or output 1218 sent in the message.

In some implementations, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1210 derived from the Card-Key-DEK 1220. In this case, the ATC value for the session key derivation is the least significant byte of the counter pATC 1204.

The format below represents a binary version example embodiment. Further, in some implementations, the first byte may be set to ASCII 'A'.

| Message Format | | | | |
|---|---|---|---|---|
| 1 | 2 | 4 | 8 | 8 |
| 0×43 (Message Type 'A') | Version | pATC | RND | Cryptogram A (MAC) |
| Cryptogram A (MAC) MAC of | 8 bytes | | | |
| 2 | 8 | 4 | 4 | 18 bytes input data |
| Version | pUID | pATC | Shared Secret | |

| Message Format | | | |
|---|---|---|---|
| 1 | 2 | 4 | 16 |
| 0×43 (Message Type 'A') | Version | pATC | Cryptogram B |
| Cryptogram A (MAC) MAC of | 8 bytes | | |
| 2 | 8 | 4 | 4 | 18 bytes input data |
| Version | pUID | pATC | Shared Secret | |
| Cryptogram B Sym Encryption of | 16 | | |
| 8 | 8 | | |
| RND | Cryptogram A | | |

Another exemplary format is shown below. In this example, the tag may be encoded in hexadecimal format.

| Message Format | | | | |
|---|---|---|---|---|
| 2 | 8 | 4 | 8 | 8 |
| Version 8 bytes | pUID | pATC | RND | Cryptogram A (MAC) |
| 8 | 8 | 4 | 4 | 18 bytes input data |
| pUID | pUID | pATC | Shared Secret | |

| Message Format | | | |
|---|---|---|---|
| 2 | 8 | 4 | 16 |
| Version 8 bytes | pUID | pATC | Cryptogram B |

-continued

| 8 | | 4 | 4 | 18 bytes input data |
|---|---|---|---|---|
| pUID | pUID | pATC | Shared | |
| Cryptogram B | 16 | | Secret | |
| Sym Encryption of | | | | |
| 8 | 8 | | | |
| RND | Cryptogram A | | | |

The UID field of the received message may be extracted to derive, from master keys Iss-Key-AUTH 502 and Iss-Key-DEK 1226, the card master keys (Card-Key-Auth 1208 and Card-Key-DEK 1220) for that particular card. Using the card master keys (Card-Key-Auth 508 and Card-Key-DEK 1220), the counter (pATC) field of the received message may be used to derive the session keys (Aut-Session-Key 1232 and DEK-Session-Key 1210) for that particular card. Cryptogram B 1218 may be decrypted using the DEK-Session-KEY, which yields cryptogram A 1214 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 1214, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 1232. The input data 1206 may take the following form: Version (2), pUID (8), pATC (4), Shared Secret (4). In some implementations, the numbers in the brackets may comprise length in bytes. In some implementations, the shared secret may be generated by one or more random number generators which may be configured to ensure, through one or more secure processes, that the random number is unpredictable. In some implementations, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some implementations, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some implementations, the pATC may start at zero and be updated by 1 each time the one or more applications generates authentication data. The authentication service may be configured to track the pATCs used during authentication sessions. In some implementations, when the authentication data uses a pATC equal to or lower than the previous value received by the authentication service, this may be interpreted as an attempt to replay an old message, and the authenticated may be rejected. In some implementations, where the pATC is greater than the previous value received, this may be evaluated to determine if it is within an acceptable range or threshold, and if it exceeds or is outside the range or threshold, verification may be deemed to have failed or be unreliable. In the MAC operation 1212, data 1206 is processed through the MAC using Aut-Session-Key 1232 to produce MAC output (cryptogram A) 1214, which is encrypted.

In order to provide additional protection against brute force attacks exposing the keys on the card, it is desirable that the MAC cryptogram 1214 be enciphered. In some implementations, data or cryptogram A 1214 to be included in the ciphertext may comprise: Random number (8), cryptogram (8). In some implementations, the numbers in the brackets may comprise length in bytes. In some implementations, the random number may be generated by one or more random number generators which may be configured to ensure, through one or more secure processes, that the random number is unpredictable. The key used to encipher this data may comprise a session key. For example, the session key may comprise DEK-Session-Key 1210. In the encryption operation 1216, data or cryptogram A 1214 and RND are processed using DEK-Session-Key 510 to produce encrypted data, cryptogram B 1218. The data 1214 may be enciphered using 3DES in cipher block chaining mode to ensure that an attacker must run any attacks over all of the ciphertext. As a non-limiting example, other algorithms, such as Advanced Encryption Standard (AES), may be used. In some implementations, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 13 illustrates a method 1300 for generating a cryptogram. For example, at block 1302, a network profile record ID (pNPR) and derivation key index (pDKI) may be used to identify which Issuer Master Keys to use in the cryptographic processes for authentication. In some implementations, the method may include performing the authentication to retrieve values of pNPR and pDKI for a contactless card at the time of authentication.

At block 1304, Issuer Master Keys may be diversified by combining them with the card's unique ID number (pUID) and the PAN sequence number (PSN) of one or more applets, for example, a payment applet.

At block 1306, Card-Key-Auth and Card-Key-DEK (unique card keys) may be created by diversifying the Issuer Master Keys to generate session keys which may be used to generate a MAC cryptogram.

At block 1308, the keys used to generate the cryptogram and encipher the data in the one or more applets may comprise the session keys of block 1030 based on the card unique keys (Card-Key-Auth and Card-Key-DEK). In some implementations, these session keys may be generated by the one or more applets and derived by using pATC, resulting in session keys Aut-Session-Key and DEK-Session-Key.

Figure 14:
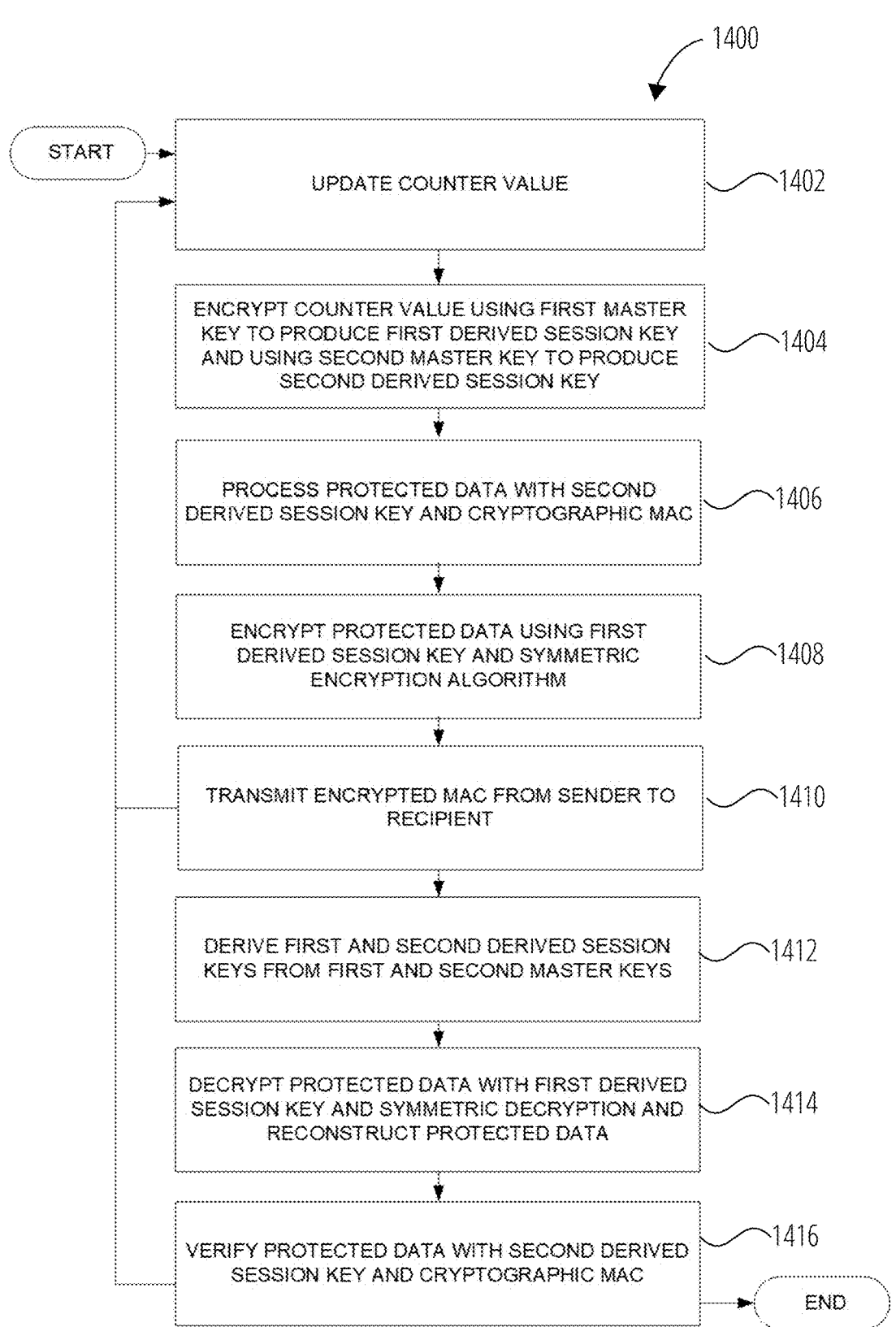
FIG. 14 illustrates an aspect of the subject matter, according to some implementations.

FIG. 14 depicts an exemplary process 1400 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1402, and other data, such as data to be protected, which it may secure share with the recipient.

At block 1404, the counter value may be encrypted by the sender using the data encryption master key to produce the data encryption derived session key, and the counter value may also be encrypted by the sender using the data integrity master key to produce the data integrity derived session key. In some implementations, a whole counter value or a portion of the counter value may be used during both encryptions.

In some implementations, the counter value may not be encrypted. In these examples, the counter may be transmitted between the sender and the recipient in the clear, i.e., without encryption.

At block 1406, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1408, the data to be protected may be encrypted by the sender using the data encryption derived session key in conjunction with a symmetric encryption algorithm. In some implementations, the MAC is combined with an equal amount of random data, for example each 8 bytes long, and then encrypted using the second session key (DEK-Session-Key).

At block 1410, the encrypted MAC is transmitted, from the sender to the recipient, with sufficient information to identify additional secret information (such as shared secret, master keys, etc.), for verification of the cryptogram.

At block 1412, the recipient uses the received counter value to independently derive the two derived session keys from the two master keys as explained above.

At block 1414, the data encryption derived session key is used in conjunction with the symmetric decryption operation to decrypt the protected data. Additional processing on the exchanged data will then occur. In some implementations, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1416, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1402) and a new set of session keys may be created (at block 1410). In some implementations, the combined random data may be discarded.

Figure 15:
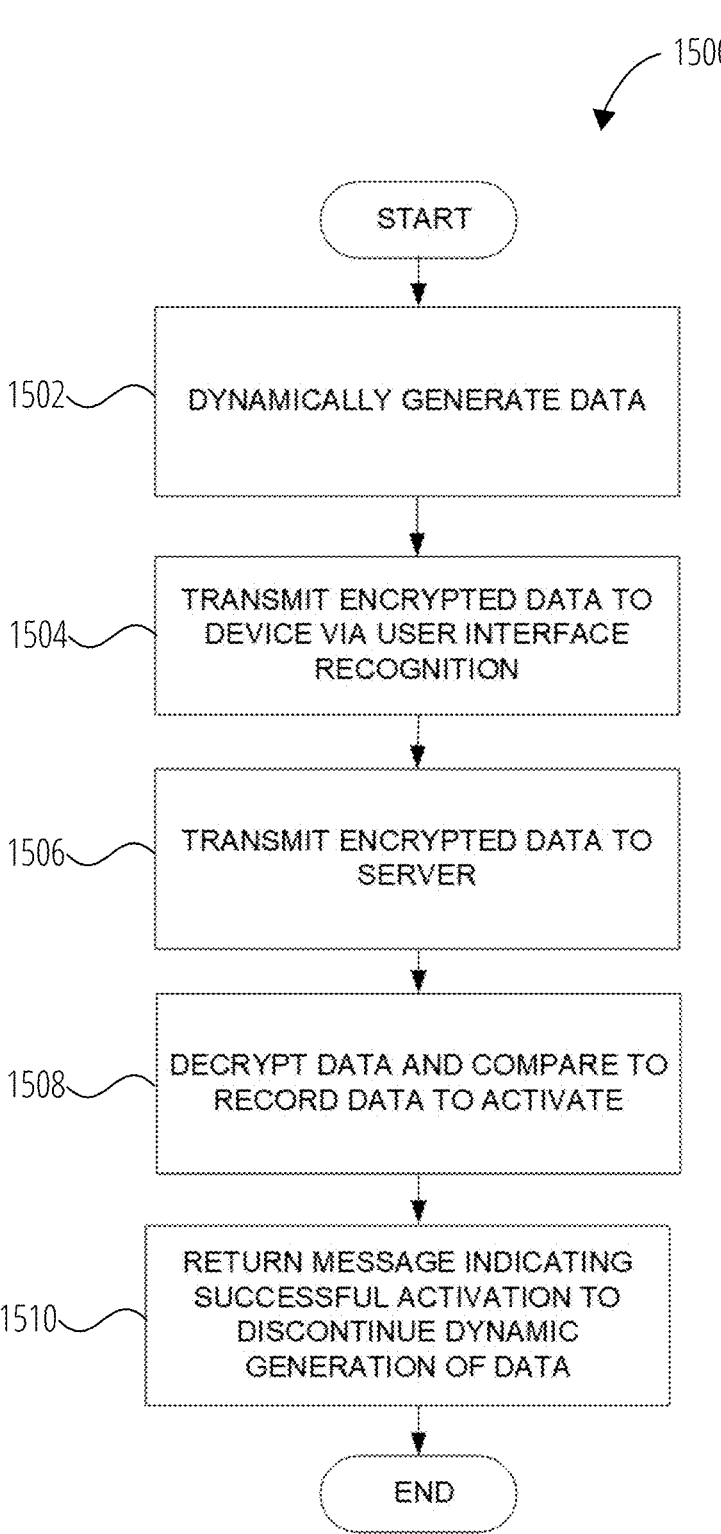
FIG. 15 illustrates an aspect of the subject matter, according to some implementations.

FIG. 15 illustrates a method 1500 for card activation, according to some implementations of the current subject matter. For example, card activation may be completed by a system including a card, a device, and one or more servers. The contactless card, device, and one or more servers may reference the same or similar components that were previously explained above, such as contactless card 602, client device 604, and a server.

The card may be configured to dynamically generate data. In some implementations, this data may include information such as an account number, card identifier, card verification value, or phone number, which may be transmitted from the card to the device. In some implementations, one or more portions of the data may be encrypted via the systems and methods disclosed herein.

At 1504, one or more portions of the dynamically generated data may be communicated to an application of the device via NFC or other wireless communication. For example, a tap of the card proximate to the device may allow the application of the device to read the one or more portions of the data associated with the contactless card. In some implementations, if the device does not comprise an application to assist in activation of the card, the tap of the card may direct the device or prompt the customer to a software application store to download an associated application to activate the card. In some implementations, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

At 1506, the one or more portions of the data may be communicated to one or more servers, such as a card issuer server. For example, one or more encrypted portions of the data may be transmitted from the device to the card issuer server for activation of the card.

At 1508, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

At 1510, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

The various elements of the devices as previously described with reference to FIGS. 1A-15 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writable or rewritable media, digital or analog media, hard disk, floppy disk, Compact Disk Read Only Memory (CD-ROM), Compact Disk Recordable (CD-R), Compact Disk Rewritable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed:

1. A computer-implemented method, comprising:

receiving, using at least one processor, one or more signals from a first device, each of the one or more signals being responsive to one or more transmissions generated and sent to the first device by a respective receiving coil, upon being energized, in a plurality of receiving coils, the plurality of receiving coils being communicatively coupled to the at least one processor;

determining, using the at least one processor, a signal strength of each of the one or more signals received from the first device;

identifying, using the at least one processor, a first signal in the one or more signals having a highest signal strength based on determined signal strengths of the one or more signals;

selecting, using the at least one processor, a first receiving coil corresponding to the first signal;

de-energizing, using the at least one processor, in response to the selecting, the plurality of receiving coils; and energizing, using the at least one processor, the selected first receiving coil and establishing, using the selected first receiving coil, a communication with the first device.

2. The method according to claim 1, wherein the first device is a contactless card.

3. The method according to claim 2, wherein a second device includes the at least one processor and the plurality of receiving coils;

wherein the establishing the communication includes establishing a near-field communication (NFC) exchange between the second device and the contactless card.

4. The method according to claim 3, wherein the contactless card, based on the establishing of the NFC exchange, is configured to transmit to the second device a contactless card data, the contactless card data includes at least one of the following: an account number associated with the contactless card, an expiration date associated with the contactless card, a card verification value (CVV) associated with the contactless card, a billing address associated with the contactless card, a name of a user associated with the contactless card, and any combination thereof.

5. The method according to claim 2, wherein the contactless card includes at least one of the following: a credit card, a debit card, an electronic gift card, a pre-paid credit card, a pre-paid debit card, and any combination thereof.

6. The method according to claim 1, wherein the plurality of receiving coils are energized simultaneously, and, upon being energized, each of the plurality of receiving coils is configured to generate and send a respective transmission to the first device.

7. The method according to claim 1, wherein the plurality of receiving coils are energized using a predetermined order, and, upon being energized, each of the plurality of receiving coils is configured to generate and send a respective transmission to the first device based on the predetermined order.

8. The method according to claim 1, wherein the selected first receiving coil is configured to receive a highest current for energizing the first receiving coil.

9. The method according to claim 1, wherein the energizing includes energizing the selected first receiving coil and de-energizing remaining receiving coils in the plurality of receiving coils.

10. The method according to claim 1, further comprising determining one or more positions of the first device in relation to the plurality of receiving coils based on the determined signal strengths.

11. The method according to claim 10, further comprising selecting a first position of the first device in the one or more positions of the first device in accordance with the selected first receiving coil, the first position corresponding to the first device being proximate to the selected first receiving coil and being distal to remaining receiving coils in the plurality of receiving coils.

12. The method according to claim 11, further comprising generating an indication to reposition the first device in accordance with the selected first position.

13. The method according to claim 12, further comprising displaying the generated indication on a graphical user interface communicatively coupled to the at least one processor.

14. A system, comprising:

at least one processor, the at least one processor being communicatively coupled to a plurality of receiving coils; and at least one non-transitory storage media storing instructions, that when executed by the at least one processor, cause the at least one processor to perform operations including:

determining one or more positions of a first device in relation to the plurality of receiving coils, the determining includes:

receiving one or more signals from the first device, each of the one or more signals being responsive to one or more transmissions generated and sent to the first device by a respective receiving coil, upon being energized, in the plurality of receiving coils;

determining a signal strength of each of the one or more signals received from the first device; and determining the one or more positions of the first devices based on determined signal strengths;

identifying a first signal in the one or more signals having a highest signal strength based on the determined signal strengths of the one or more signals;

selecting a first receiving coil corresponding to the first signal, and determining a first position in the one or more positions being proximate to the first receiving coil;

de-energizing, in response to the selecting, the plurality of receiving coils;

energizing the selected first receiving coil and establishing, using the selected first receiving coil, a communication with the first device; and generating an indication to reposition the first device to the first position.

15. The system according to claim 14, wherein the operations further comprise displaying the generated indication on a graphical user interface communicatively coupled to the at least one processor.

16. The system according to claim 14, wherein the first device is a contactless card, wherein the establishing the communication includes establishing a near-field communication (NFC) exchange with the contactless card;

wherein the contactless card, based on the establishing of the NFC exchange, is configured to transmit a contactless card data, the contactless card data includes at least one of the following: an account number associated with the contactless card, an expiration date associated with the contactless card, a card verification value (CVV) associated with the contactless card, a billing address associated with the contactless card, a name of a user associated with the contactless card, and any combination thereof.

17. The system according to claim 14, wherein the selected first receiving coil is configured to receive a highest current for energizing the first receiving coil.

18. The system according to claim 14, wherein the energizing includes energizing the selected first receiving coil and de-energizing remaining receiving coils in the plurality of receiving coils.

19. A computer program product comprising a non-transitory machine-readable medium storing instructions that, when executed by at least one programmable processor, cause the at least one programmable processor to perform operations comprising:

determining a signal strength of each of one or more signals received from a first device, wherein each of the one or more signals being responsive to one or more transmissions generated and sent to the first device by one or more receiving coils in a plurality of receiving coils, upon being energized;

identifying a first signal in the one or more signals having a highest signal strength based on determined signal strengths of the one or more signals;

selecting a first receiving coil corresponding to the first signal;

de-energizing, in response to the selecting, the plurality of receiving coils; and energizing the selected first receiving coil and establishing, using the selected first receiving coil, a communication with the first device.

* * * * *